US008873009B2

(12) United States Patent
Hirosawa

(10) Patent No.: US 8,873,009 B2
(45) Date of Patent: Oct. 28, 2014

(54) LIQUID CRYSTAL DISPLAY DEVICE

(75) Inventor: Jin Hirosawa, Saitama-ken (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 13/548,919

(22) Filed: Jul. 13, 2012

(65) Prior Publication Data

US 2013/0057816 A1 Mar. 7, 2013

(30) Foreign Application Priority Data

Sep. 2, 2011 (JP) ................................ 2011-191688

(51) Int. Cl.
*G02F 1/1343* (2006.01)
*G02F 1/1337* (2006.01)

(52) U.S. Cl.
CPC .. *G02F 1/1337* (2013.01); *G02F 2001/134318* (2013.01); *G02F 2001/134381* (2013.01); *G02F 1/134309* (2013.01)
USPC .............. 349/141; 349/39; 349/132; 349/139

(58) Field of Classification Search
CPC .................... G02F 1/134363; G02F 1/134309; G02F 1/1337; G02F 1/136213; G02F 2001/133738; G02F 2001/136218
USPC ............. 349/39, 42, 132, 139, 141, 143, 146; 345/87, 92
See application file for complete search history.

(56) References Cited

U.S. PATENT DOCUMENTS

| 6,266,116 B1 | 7/2001 | Ohta et al. |
| 2001/0010575 A1 | 8/2001 | Yoshida et al. |
| 2004/0165136 A1 | 8/2004 | Sugiyama et al. |
| 2005/0206824 A1 | 9/2005 | Son et al. |
| 2005/0219453 A1 | 10/2005 | Kubo et al. |

(Continued)

FOREIGN PATENT DOCUMENTS

| JP | 6-222397 | 8/1994 |
| JP | 7-159807 | 6/1995 |

(Continued)

OTHER PUBLICATIONS

Office Action issued Sep. 3, 2013, in Japanese Patent Application No. 2011-191688 (submitting English translation only).

(Continued)

*Primary Examiner* — Dung Nguyen
*Assistant Examiner* — Tai Duong
(74) *Attorney, Agent, or Firm* — Oblon, Spivak, McClelland, Maier & Neustadt, L.L.P.

(57) ABSTRACT

A liquid crystal display device includes first and second substrates. The first substrate includes a pixel electrode covered by a first alignment film and having a belt-shaped main pixel electrode. The first alignment film is alignment processed in a first alignment treatment direction substantially in parallel with an extending direction of the main pixel electrode. The second substrate includes a common electrode arranged on both sides sandwiching the pixel electrode and extending substantially in parallel with the extending direction of the main pixel electrode. A sub-common electrode extends in a direction crossing the extending direction of the main pixel electrode on one end side of the main pixel electrode located on a starting side of the first alignment treatment direction. A second alignment film is processed in a second alignment treatment direction substantially in the same direction as the first alignment treatment direction.

11 Claims, 11 Drawing Sheets

(56) References Cited

U.S. PATENT DOCUMENTS

| | | | |
|---|---|---|---|
| 2007/0115234 A1 | 5/2007 | Kim et al. | |
| 2007/0216841 A1* | 9/2007 | Konno | 349/141 |
| 2008/0062358 A1 | 3/2008 | Lee et al. | |
| 2008/0180590 A1 | 7/2008 | Lee et al. | |
| 2008/0180623 A1 | 7/2008 | Lee et al. | |
| 2008/0186439 A1 | 8/2008 | Kwon et al. | |
| 2009/0207363 A1* | 8/2009 | Hirosawa | 349/139 |
| 2010/0020257 A1* | 1/2010 | Jun et al. | 349/44 |
| 2013/0010235 A1* | 1/2013 | Hirosawa et al. | 349/96 |
| 2013/0050601 A1* | 2/2013 | Takeda et al. | 349/41 |

FOREIGN PATENT DOCUMENTS

| | | |
|---|---|---|
| JP | 9-105908 A | 4/1997 |
| JP | 9-160041 | 6/1997 |
| JP | 9-160042 | 6/1997 |
| JP | 9-160061 | 6/1997 |
| JP | 10-26765 | 1/1998 |
| JP | 10-90708 | 4/1998 |
| JP | 2000-81641 A | 3/2000 |
| JP | 2005-3802 | 1/2005 |
| JP | 3644653 | 2/2005 |
| JP | 2005-242307 | 9/2005 |
| JP | 2009-109657 | 5/2009 |
| JP | 2009-192822 A | 8/2009 |

OTHER PUBLICATIONS

U.S. Appl. No. 13/454,711, filed Apr. 24, 2012, Morita, et al.
U.S. Appl. No. 13/546,655, filed Jul. 11, 2012, Takano, et al.
Office Action issued Mar. 4, 2014 in Japanese Application No. 2011-191688 (English Translation).

* cited by examiner

LIQUID CRYSTAL DISPLAY DEVICE

CROSS-REFERENCE TO RELATED APPLICATION

This application is based upon and claims the benefit of priority from prior Japanese Patent Application No. 2011-191688, filed Sep. 2, 2011, the entire contents of which are incorporated herein by reference.

FIELD

Embodiments described herein relate generally to a liquid crystal display device.

BACKGROUND

In recent years, a flat panel display is developed briskly. Especially, the liquid crystal display device gets a lot of attention from advantages, such as light weight, thin shape, and low power consumption. In an active matrix type liquid crystal display device equipped with a switching element in each pixel, a structure using lateral electric field, such as IPS (In-Plane Switching) mode and FFS (Fringe Field Switching) mode, attracts attention. The liquid crystal display device using the lateral electric field mode is equipped with pixel electrodes and a common electrode formed in an array substrate, respectively. Liquid crystal molecules are switched by the lateral electric field substantially in parallel with the principal surface of the array substrate.

On the other hand, another technique is also proposed, in which the liquid crystal molecules are switched using the lateral electric field or an oblique electric field between the pixel electrode formed in the array substrate and the common electrode formed in a counter substrate.

BRIEF DESCRIPTION OF THE DRAWINGS

The accompanying drawings, which are incorporated in and constitute a portion of the specification, illustrate embodiments of the invention, and together with the general description given above and the detailed description of the embodiments given below, serve to explain the principles of the invention.

FIG. 7 is a figure schematically showing the alignment state of a liquid crystal molecules in the liquid crystal layer at the time of ON.

FIG. 13 is a figure schematically showing the alignment state of the liquid crystal molecules in the liquid crystal layer at the time of ON.

DETAILED DESCRIPTION

Figure 1:
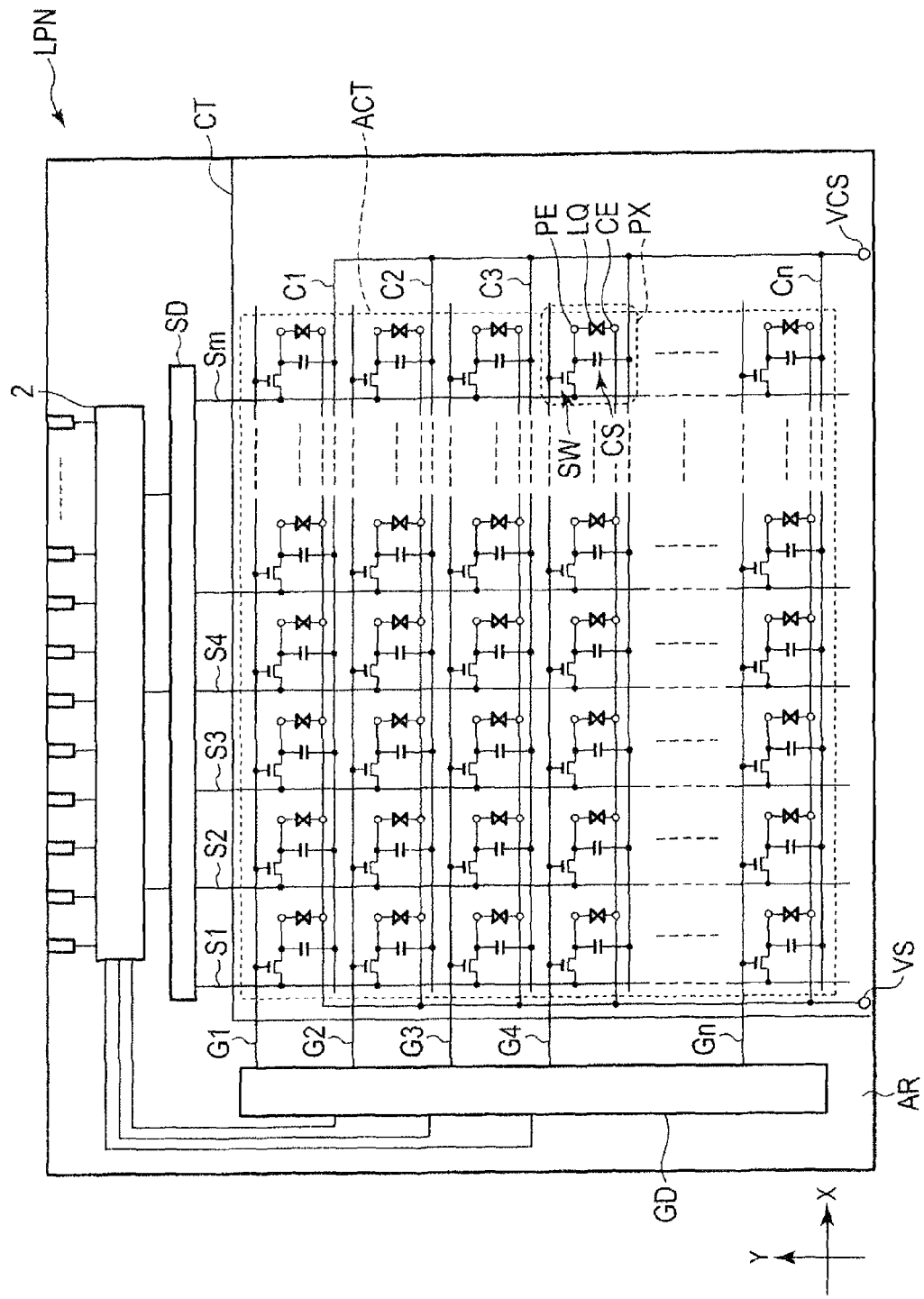
FIG. 1 is a figure schematically showing a structure and the equivalent circuit of a liquid crystal display device according to the embodiment.

A liquid crystal display device according to an exemplary embodiment of the present invention will now be described with reference to the accompanying drawings wherein the same or like reference numerals designate the same or corresponding portion s throughout the several views.

According to one embodiment, a liquid crystal display device includes: a first substrate including a pixel electrode having a main pixel electrode in the shape of a belt and a first alignment film covering the pixel electrode, the first alignment film being alignment processed in a first alignment treatment direction substantially in parallel with an extending direction of the main pixel electrode; a second substrate including, a common electrode having a main common electrode arranged on both sides sandwiching the pixel electrode and extending substantially in parallel with the extending direction of the main pixel electrode, and a sub-common electrode extending in a direction crossing the extending direction of the main pixel electrode on one end side of the main pixel electrode located on a starting side of the first alignment treatment direction, and a second alignment film alignment processed in a second alignment treatment direction substantially in the same direction as the first alignment treatment direction, a liquid crystal layer held between the first substrate and the second substrate and having liquid crystal molecules.

According to other embodiment, a liquid crystal display device includes: a first substrate including; a gate line extending in a first direction and a source line extending in a second direction orthogonally crossing the first direction, a pixel electrode having a main pixel electrode in the shape of a belt extending in the second direction, a first common electrode having a first main common electrode facing the source line and extending in second direction, and a first alignment film covering the pixel electrode and the first common electrode and being alignment processed in a first alignment treatment direction substantially in parallel with the second direction, a second substrate including; and a second common electrode having a second main common electrode extending in the second direction on both sides sandwiching the main pixel electrode and a first sub-common electrode extending in the first direction on one end side of the main pixel electrode located on a starting side of the first alignment treatment direction, and a second alignment film covering the second common electrode and being alignment processed in a second alignment treatment direction which is the same direction as the first alignment treatment direction, a liquid crystal layer held between the first substrate and the second substrate and having liquid crystal molecules.

FIG. 1 is a figure schematically showing the structure and the equivalent circuit of a liquid crystal display device according to the embodiment.

The liquid crystal display device includes an active-matrix type liquid crystal display panel LPN. The liquid crystal display panel LPN is equipped with an array substrate AR as a first substrate, a counter substrates CT as a second substrate arranged opposing the array substrate AR, a liquid crystal layer held between the array substrate AR and the counter substrate CT. The liquid crystal display panel LPN includes an active area ACT which displays images. The active area ACT is constituted by a plurality of pixels PX arranged in the shape of a (m×n) matrix (here, "m" and "n" are positive integers).

The liquid crystal display panel LPN is equipped with "n" gate lines G (G1-Gn), "n" auxiliary capacitance lines C (C1-Cn), "m" source lines S (S1-Sm), etc., in the active area ACT. The gate line G and the auxiliary capacitance line C correspond to signal lines extending in a first direction, respectively. The gate line G and the auxiliary capacitance line C are arranged in turns along a second direction Y that orthogonally intersects the first direction X. The source lines S cross the gate line G and the capacitance line C. The source lines S extend linearly in the second direction Y, respectively. The gate line G, the auxiliary capacitance line C and the source lines S do not necessarily extend linearly, and a portion thereof may be crooked partially.

Each gate line G is pulled out to outside of the active area ACT, and is connected to a gate driver GD. Each source line S is pulled out to the outside of the active area ACT, and is connected to a source driver SD. At least a portion of the gate driver GD and the source driver SD is formed in the array substrate AR, for example. The gate driver GD and the source driver SD are connected with the driver IC chip 2 provided in the array substrate AR and having an implemented controller.

Each pixel PX includes a switching element SW, a pixel electrode PE, a common electrode CE, etc. Retention capacitance Cs is formed, for example, between the auxiliary capacitance line C and the pixel electrode PE. The auxiliary capacitance line C is electrically connected with a voltage impressing portion VCS to which the auxiliary capacitance voltage is impressed.

In addition, in the liquid crystal display panel LPN according to this embodiment, while the pixel electrode PE is formed in the array substrate AR, at least one portion of the common electrode CE is formed in the counter substrate CT. Liquid crystal molecules of the liquid crystal layer LQ are switched mainly using an electric field formed between the pixel electrode PE and the common electrode CE. The electric field formed between the pixel electrode PE and the common electrode CE is a lateral electric field substantially in parallel with the principal surface of the array substrate AR or the principal surface of the counter substrate CT, or an oblique electric field slightly oblique with respect to the principle surfaces of the substrate.

The switching element SW is constituted by an n channel type thin film transistor (TFT), for example. The switching element SW is electrically connected with the gate line G and the source line S. The (m×n) switching elements SW are formed in the active area ACT. The switching element SW may be either a top-gate type or a bottom-gate type. Though the semiconductor layer is formed of poly-silicon, the semiconductor layer may be formed of amorphous silicon.

The pixel electrode PE is arranged in each pixel and electrically connected with the switching element SW. The common electrode CE is arranged in common to the plurality of pixel electrodes PE through the liquid crystal layer LQ. Though the pixel electrode PE and the common electrode CE are formed by light transmissive conductive materials, such as Indium Tin Oxide (ITO), Indium Zinc Oxide (IZO), etc., other metals such as aluminum may be used.

The array substrate AR includes an electric power supply portion VS formed outside of the active area ACT to impress a voltage to the common electrode CE. Furthermore, the common electrode CE is drawn to outside of the active area ACT and electrically connected with an electric power supply portion VS formed in the array substrate AR through an electric conductive component which is not illustrated.

Figure 2:
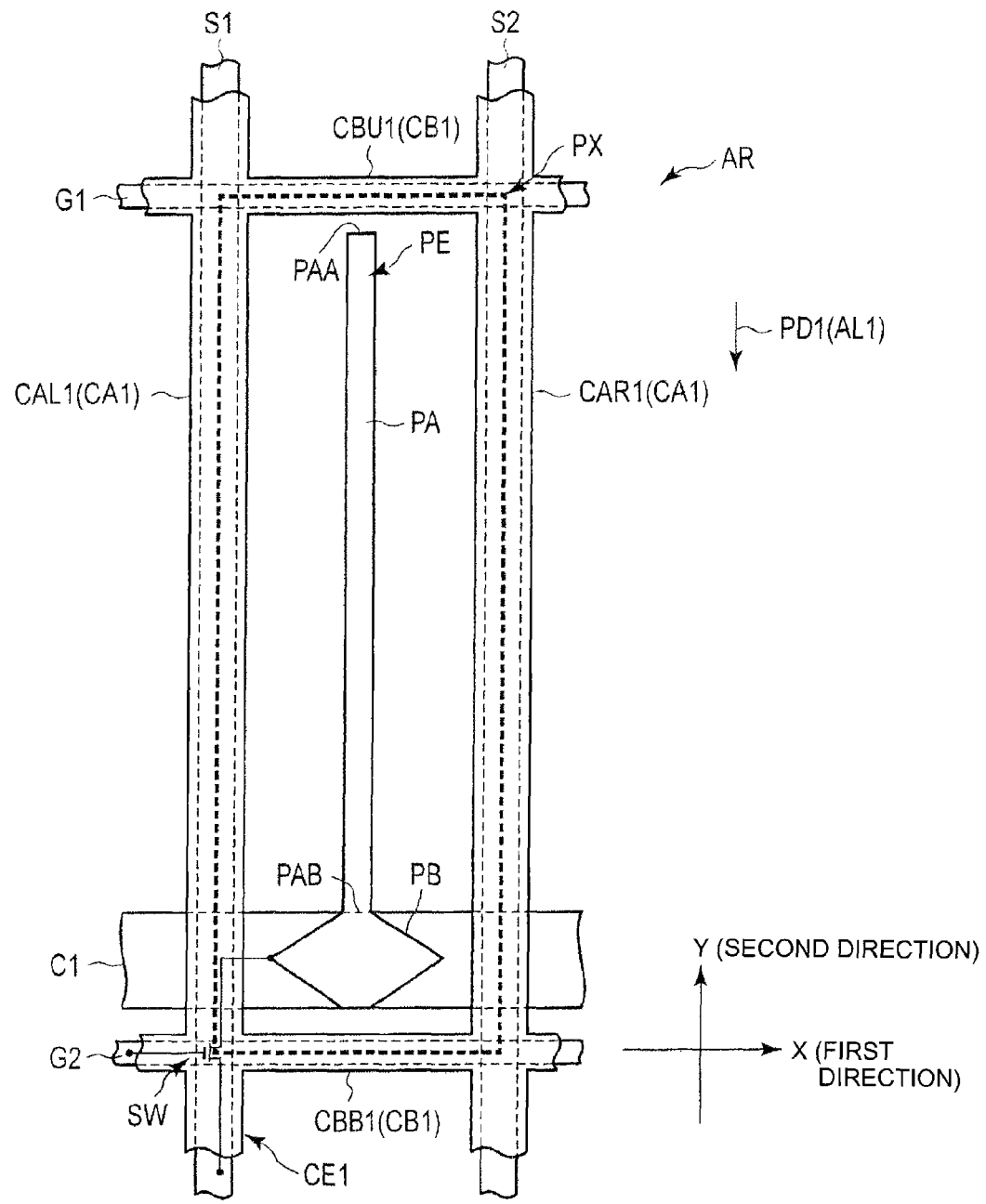
FIG. 2 is a plan view schematically showing a structure of one pixel when the array substrate shown in FIG. 1 is seen from a counter substrate side according to a first embodiment.

FIG. 2 is a plan view schematically showing the structure of one pixel when the liquid crystal display panel according to a first embodiment is seen from the counter substrate side. Herein, a plan view in a X-Y plane specified in the first direction X and the second direction Y is shown.

The array substrate AR is equipped with a gate line G1, a gate line G2, an auxiliary capacitance line C1, a source line S1, a source line S2, a switching element SW, the pixel electrode PE, and a first alignment film AL1, etc. In the illustrated example, the array substrate AR is further equipped with a first common electrode CE1 which is a portion of the common electrodes CE.

As shown in FIG. 2, the pixel PX has the shape of a rectangle whose length in the first direction X is shorter than the length in the second direction Y, as shown in a dashed line. The gate line G1 and the gate line G2 are arranged along the second direction and extend along the first direction X. The auxiliary capacitance line is arranged between the gate line G1 and the gate line G2 and extends in the first direction X. The source line S1 and the source line S2 are arranged with a predetermined distance therebetween in the first direction X and extend along the second direction Y, respectively.

In the illustrated example, the source line S1 is arranged at the left-hand side end in the pixel PX. Precisely, the source line S1 is arranged striding over a boundary between the illustrated pixel and a pixel PX adjoining the illustrated pixel PX on the left-hand side. The source line S2 is arranged at the right-hand side end. Precisely, the source line S2 is arranged striding over a boundary between the illustrated pixel and a pixel PX adjoining the illustrated pixel PX on the right-hand side.

Moreover, in the pixel PX, the gate line G1 is arranged at an upper end portion. Precisely, the gate line G1 is arranged striding over a boundary between the illustrated pixel and a pixel which adjoins the illustrated pixel PX on its upper end side. The gate line G2 is arranged at a lower end portion. Precisely, the gate line G2 is arranged striding over a boundary between the illustrated pixel and a pixel adjoining the illustrated pixel PX on its lower end side.

Moreover, in the illustrated pixel PX, the auxiliary capacitance line C1 is eccentrically-located in the gate line G2 side rather than the gate line G1 side. That is, the distance between the auxiliary capacitance line C1 and the gate line G2 in the second direction Y is smaller than that between the auxiliary capacitance line C1 and the gate line G1 in the second direction Y.

The switching element SW is electrically connected with the gate line G2 and the source line S1 in the illustrated example. Namely, the switching element SW is formed in an intersection of the gate line G2 with the source line S1. A gate electrode of the switching transistor is connected with the gate line G2 and a source electrode WS is connected with the source line S1. A drain electrode extending along the source line S1 and the auxiliary capacitance line C1 is electrically connected with the pixel electrode PE in a region which overlaps with the auxiliary capacitance line C1. The switching element SW is formed in the overlapped region with the source line S1 and the auxiliary capacitance line C1, and hardly runs off the overlapped region. Thereby, reduction of the area of an aperture which contributes to a display is suppressed when the switching element SW is arranged in the pixel PX.

The pixel electrode PE is arranged between the adjoining source line S1 and source line S2. Moreover, the pixel electrode PE is located between the gate line G1 and the gate line G2 passing on the auxiliary capacitance line C1. The pixel electrode PE is electrically connected with the switching element SW.

The pixel electrode PE is equipped with a main pixel electrode PA and a sub-pixel electrode PB electrically connected mutually. The main pixel electrode PA linearly extends along the second direction Y toward the gate line G1 from the sub-pixel electrode PB (from the sub-pixel electrode PB to near the upper end of the pixel PX). The main pixel electrode PA is formed in the shape of a belt having the substantially same width in the first direction X.

The sub-pixel electrode PB is located in the region which overlaps with the auxiliary capacitance line C1, and is electrically connected with the switching element SW. The sub-pixel electrode PB is formed along the first direction X more broadly than the width of the main pixel electrode PA. Although the illustrated sub-pixel electrode PB is formed substantially in a diamond shape, the sub-pixel electrode PB may be formed in the shape of a rectangle or the shape of an ellipse extending in the first direction X.

The pixel electrode PE is arranged between the source line S1 and the source line S2. The source line S1 and the source line S2 are located on the both sides which sandwich the pixel electrode PE. In the illustrated example, the pixel electrode PE is arranged substantially in a center position between the source line S1 and the source line S2, i.e., the center of the pixel PX. For this reason, the distance between the source line S1 and the main pixel electrode PA in the first direction X is substantially the same as that between the source line S2 and the main pixel electrode PA in the first direction X.

A first common electrode CE1 includes a first main common electrode CA1 and a first sub-common electrode CB1 on the array substrate. The first main common electrode CA1 and the first sub-common electrode CB1 are electrically connected mutually.

The first main common electrode CA1 linearly extends on both sides sandwiching the main pixel electrode PA in an extending direction of the main pixel electrode PA in parallel with the second direction Y. The first main common electrode CA1 faces the source line S and extends in a parallel with the direction in which the main pixel electrode PA extends. The first main common electrode CA1 is formed in the shape of belt having substantially the same width in the first direction X.

In the illustrated example, the pair of first main common electrodes CA1 is arranged in parallel with a predetermined distance therebetween in the first direction X, and is arranged in the right-and-left both ends of the pixel PX, respectively. Hereinafter, in order to distinguish the pair of first main common electrodes CA1, the first main common electrode on the left-hand side in the figure is called CAL1, and the first main common electrode on the right-hand side in the figure is called CAR1. The first main common electrode CAL1 counters with the source line S1. The first main common electrode CAR1 counters with the source line S2.

In one pixel PX, the first main common electrode CAL1 is arranged on the left-hand side, and the first main common electrode CAR1 is arranged on the right-hand side. Precisely, the first main common electrode CAL1 is arranged striding over a boundary between the illustrated pixel and an adjoining pixel on its left-hand side. The first main common electrode CAR1 is arranged striding over between the illustrated pixel and an adjoining pixel on its right-hand side The first sub-common electrode CB1 linearly extends on both sides sandwiching the pixel electrode PE in the first direction X in parallel with a direction in which the sub-pixel electrode PB extends. The first sub-common electrode CB1 faces the gate line G and extends in a parallel direction in which the sub-pixel electrode PB extends. The first sub-common electrode CB1 is formed in the shape of belt having substantially the same width in the second direction Y. However, the width of the first sub-common electrode CB1 is necessarily the same along the second direction Y. The first sub-common electrode CB1 is formed integrally or continuously with the first main common electrodes CA1 and electrically connected with the first main common electrodes CA1.

In the illustrated example, the pair of first sub-common electrodes CB1 extend in parallel with the second direction Y with a predetermined distance therebetween, and are arranged in the upper-and-bottom both ends of the pixel PX, respectively. Hereinafter, in order to distinguish the pair of sub-common electrodes CB1, the first sub-common electrode on the upper-hand side in the figure is called CBU1, and the first sub-pixel electrode on the lower-side in the figure is called CBB1. The first sub-common electrode CBU1 counters with the gate line G1. The first sub-common pixel electrode CBB1 counters with the gate line G2.

In one pixel PX, the first sub-common electrode CBU1 is arranged on the upper-hand side, and the first sub-common electrode CBB1 is arranged on the lower-hand side. Precisely, the first sub-common electrode CBU1 is arranged striding over a boundary between the illustrated pixel and an adjoining pixel on its upper-hand side and the first sub-common electrode CBB1 is arranged striding over a boundary between the illustrated pixel and an adjoining pixel on its lower-hand side. That is, in this embodiment, the first main common electrodes CA1 and the first sub-common electrodes CB1 of the first common electrode CE1, which are formed on the array substrate AR, are formed in the shape a lattice defining the respective pixels.

The following relations can be said if its attention is paid to the positional relationship between the pixel electrode PE and the first common electrode CE1.

In the X-Y plane, the main pixel electrode PA and the first main common electrode CA1 are arranged by turns along the first direction X. The pixel electrodes PA and the first main common electrode CA1 are arranged substantially in parallel each other. At this time, none of the first main common electrode CA1 overlaps with the pixel electrode PE in the X-Y plane. One pixel electrode PE is located between the adjoining first main common electrode CAL1 and first main common electrode CAR1. That is, the first main common electrode CAL1 and the first main common electrode CAR1 are arranged on the both sides which sandwich the main pixel electrode PA. For this reason, the first main common electrode CAL1, the main pixel electrode PA, and the first main common electrode CAR1 are arranged along the first direction X in this order.

The inter-electrode distance between the main pixel electrode PA and the first main common electrode CAL1 is substantially the same in the first direction X. That is, the inter-electrode distance between the main pixel electrode PA and the first main common electrode CAL1 is substantially the same as that between the first main common electrode CAR1 and the main pixel electrode PA in the first direction X.

Moreover, the distance between the main pixel electrode PA and the first main common electrode CA1 in the first direction X is larger than the thickness of the liquid crystal layer LQ, e.g., more than twice the thickness of the liquid crystal layer LQ.

In the X-Y plane, the sub-pixel electrode PB and the first sub-common electrode CB1 are arranged by turns along the second direction Y. The sub-pixel electrodes PB and the first sub-common electrode CB1 are arranged substantially in parallel each other. At this time, neither of the first sub-common electrodes CB1 overlaps with the pixel electrode PE in the X-Y plane. That is, one sub-pixel electrode PB is located between the adjoining the first sub-common electrode CBU1 and first sub-common electrode CBB1. Namely, the first sub-common electrode CBU1 and the first sub-common electrode CBB1 are arranged on the both sides which sandwich the sub-pixel electrode PB. For this reason, the first sub-common electrode CBU1, the sub-pixel electrode PB, and the first sub-common electrode CBB1 are arranged along the second direction Y in this order.

In the array substrate AR, the pixel electrode PE and first common electrode CE1 are covered with a first alignment film AL1. Alignment treatment (for example, rubbing processing or optical alignment processing) is made to this first alignment film AL1 along a first alignment direction PD1 to initially align the liquid crystal molecule of the liquid crystal layer LQ. The first alignment treatment direction PD1 is substantially in parallel with the second direction Y in which the main pixel electrode PA extends.

The positional relationship among the first alignment treatment direction PD1, the pixel electrode PE and the first common electrode CE1 is explained. The main pixel electrode PA of the pixel electrode PE includes one end portion PAA located in a starting side of the first alignment treatment direction PD1, and the other end portion PAB located in an ending side of the first alignment treatment direction PD1. The sub-pixel electrode PB is connected with the other end portion PAB of the main pixel electrode PA in the illustrated example. The first sub-common electrode CBU1 extends along the first direction X on the one end portion PAA of the main pixel electrode PA.

Figures 3A, 3B, 3C:
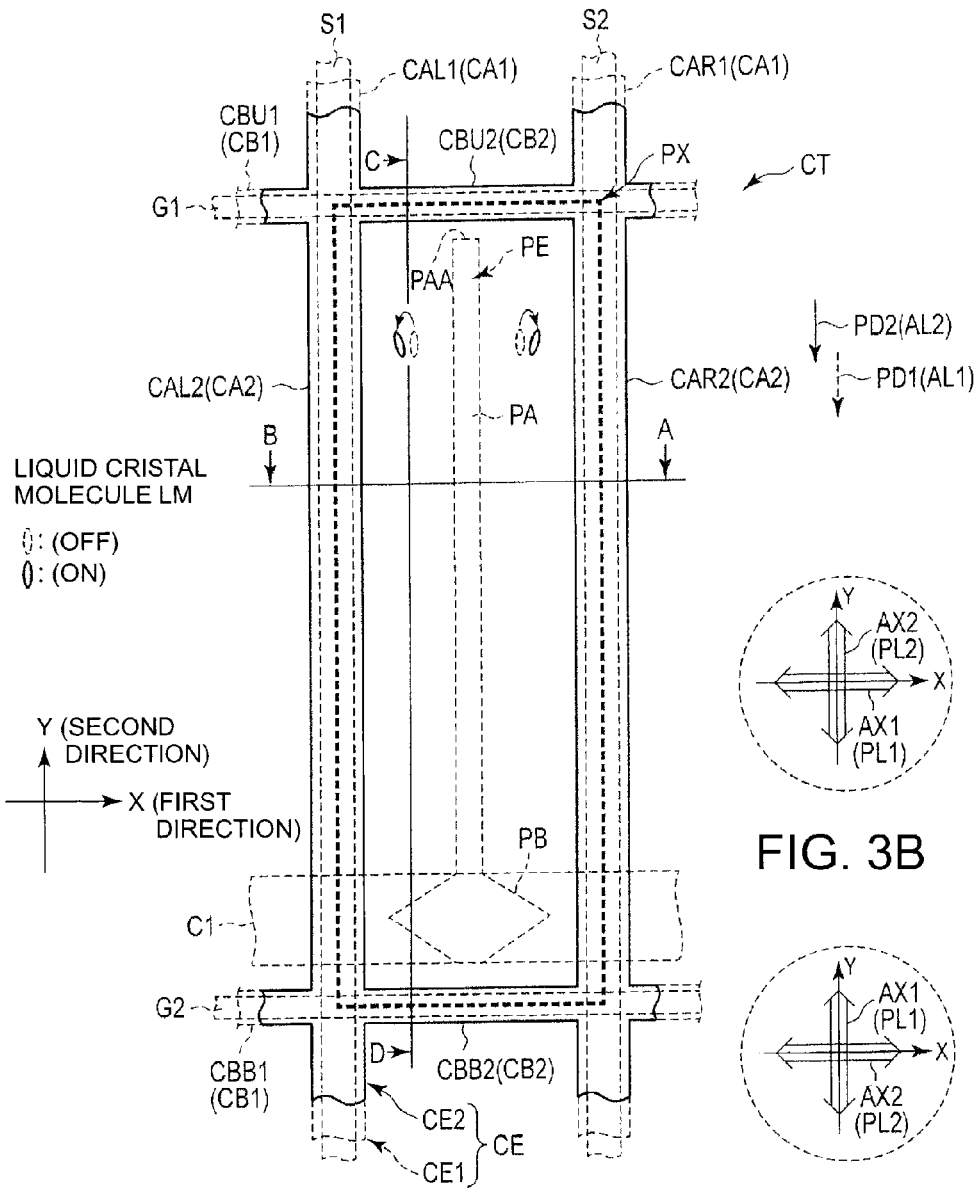
FIG. 3A is a plan view schematically showing the structure of one pixel in the counter substrate shown in FIG. 1.
FIGS. 3B and 3C show the relationship between a polarization axis and an initial alignment direction.

FIG. 3A is a plan view schematically showing the structure of the PX in the counter substrate CT shown in FIG. 1. Here, the plan view in the X-Y plane is shown. In addition, only structures required for explanation are illustrated. The dashed line shows here principal portions of the array substrate, such as the pixel electrode PE, the first common electrode CE1, the source line S, the gate line G, and the auxiliary capacitance line C, etc.

The counter substrate CT is equipped with a second common electrode CE2 which is a portion of the common electrodes CE. The second common electrode CE2 includes a second main common electrode CA2 and a second sub-common electrode CB2. The second main common electrode CA2 and the second sub-common electrode CB2 are electrically connected mutually. Furthermore, the second main common electrode CA2 and the second sub-common electrode CB2 are electrically connected with the first common electrode CE1 provided in the array substrate, for example, in outside of the active area. The potential thereof is the same as that of the first common electrode CE1.

The second main common electrode CA2 linearly extends on both sides sandwiching the main pixel electrode PA in parallel with the second direction Y in which the main pixel electrode PA extends. The second main common electrode CA2 faces the first main common electrode CA1 and extends in a parallel with the direction in which the main pixel electrode PA extends. The second main common electrode CA2 is formed in the shape of belt having substantially the same width in the first direction X.

In the illustrated example, the pair of second main common electrodes CA2 is arranged in the first direction X in parallel, with a predetermined distance therebetween, and is arranged in the right-and-left both ends of the pixel PX, respectively. Hereinafter, in order to distinguish the pair of second main common electrodes CA2, the second main common electrode on the left-hand side in the figure is called CAL2, and the second main common electrode on the right-hand side in the figure is called CAR2. The second main common electrode CAL2 faces the first main common electrode CAL1 and is located above the source line S1. The second main common electrode CAR2 faces the first main common electrode CAR1, and is located above the source line S2.

In one pixel PX, the second main common electrode CAL2 is arranged on the left-hand side, and the second main common electrode CAR2 is arranged on the right-hand side. Precisely, the second main common electrode CAL2 is arranged striding over a boundary between the illustrated pixel and an adjoining pixel on its left-hand side. The second main common electrode CAR2 is arranged striding over a boundary between the illustrated pixel and an adjoining pixel on its right-hand side The second sub-common electrode CB2 linearly extends on both sides sandwiching the pixel electrode PE in parallel with the first direction X in which the sub-pixel electrode PB extends. The second sub-common electrode CB2 faces the first sub-common electrode CB1 and extends in a parallel with the direction in which the sub-pixel electrode PB extends. The second sub-common electrode CB2 is formed in the shape of a belt having substantially the same width in the second direction Y. The second sub-common electrode CB2 is formed integrally or continuously with the second main common electrodes CA2 and electrically connected with the second main common electrodes CA2. That is, the second common electrode CE2 is formed in the shape of a lattice.

In the illustrated example, the pair of second sub-common electrodes CB2 extends in parallel, with a predetermined distance therebetween in the second direction Y, and are arranged in the upper-and-bottom both ends of the pixel PX, respectively. Hereinafter, in order to distinguish the pair of second sub-common electrodes CB2, the second sub-common electrode on the upper-hand side in the figure is called CBU2, and the second sub-pixel electrode on the lower-side in the figure is called CBB2. The second sub-common electrode CBU2 faces the first sub-common electrode CBU1, and is located above the gate line G1. The second sub-common electrode CBB2 faces the first sub-common electrode CBB1 and is located above the gate line G2.

In one pixel PX, the second sub-common electrode CBU2 is arranged on the upper-hand side, and the second sub-common electrode CBB2 is arranged on the lower-hand side. Precisely, the second sub-common electrode CBU2 is arranged striding over a boundary between the illustrated pixel and an adjoining pixel on its upper-hand side. The second sub-common electrode CBB2 is arranged striding over a boundary between the illustrated pixel and an adjoining pixel on its lower-hand side.

The second common electrode CE2 is covered with the second alignment film AL2 in the counter substrate CT. Alignment treatment (for example, rubbing processing or optical alignment processing) is made to the second alignment film AL2 along a second alignment treatment direction PD2 to initially align the liquid crystal molecule of the liquid crystal layer LQ. The second alignment treatment direction PD2 is substantially in parallel with the second direction Y in which the main pixel electrode PA extends. In the X-Y plane, the second alignment treatment direction PD2 is in parallel with and the same direction as the first alignment treatment direction PD1.

If the positional relationship among the second alignment treatment direction PD2, the pixel electrode PE and the second common electrode CE2 is explained, the second sub-common electrode CBU2 extends along the first direction X at the one end portion PAA of the main pixel electrode PA.

Figure 4:
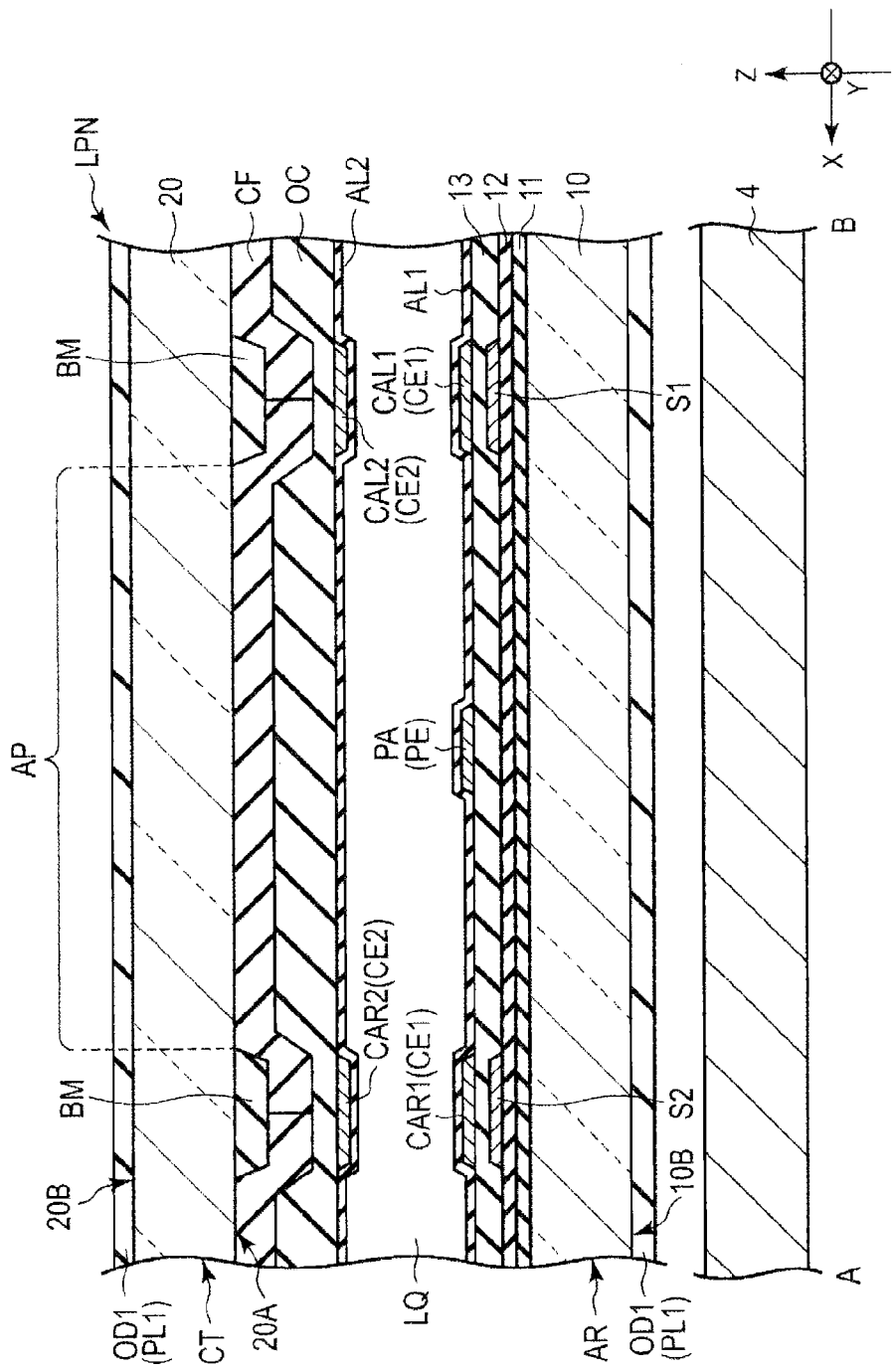
FIG. 4 is a cross-sectional view schematically showing the structure of the liquid crystal display panel taken along line A-B shown in FIG. 3A, seen from a gate line G1 side.
Figure 5:
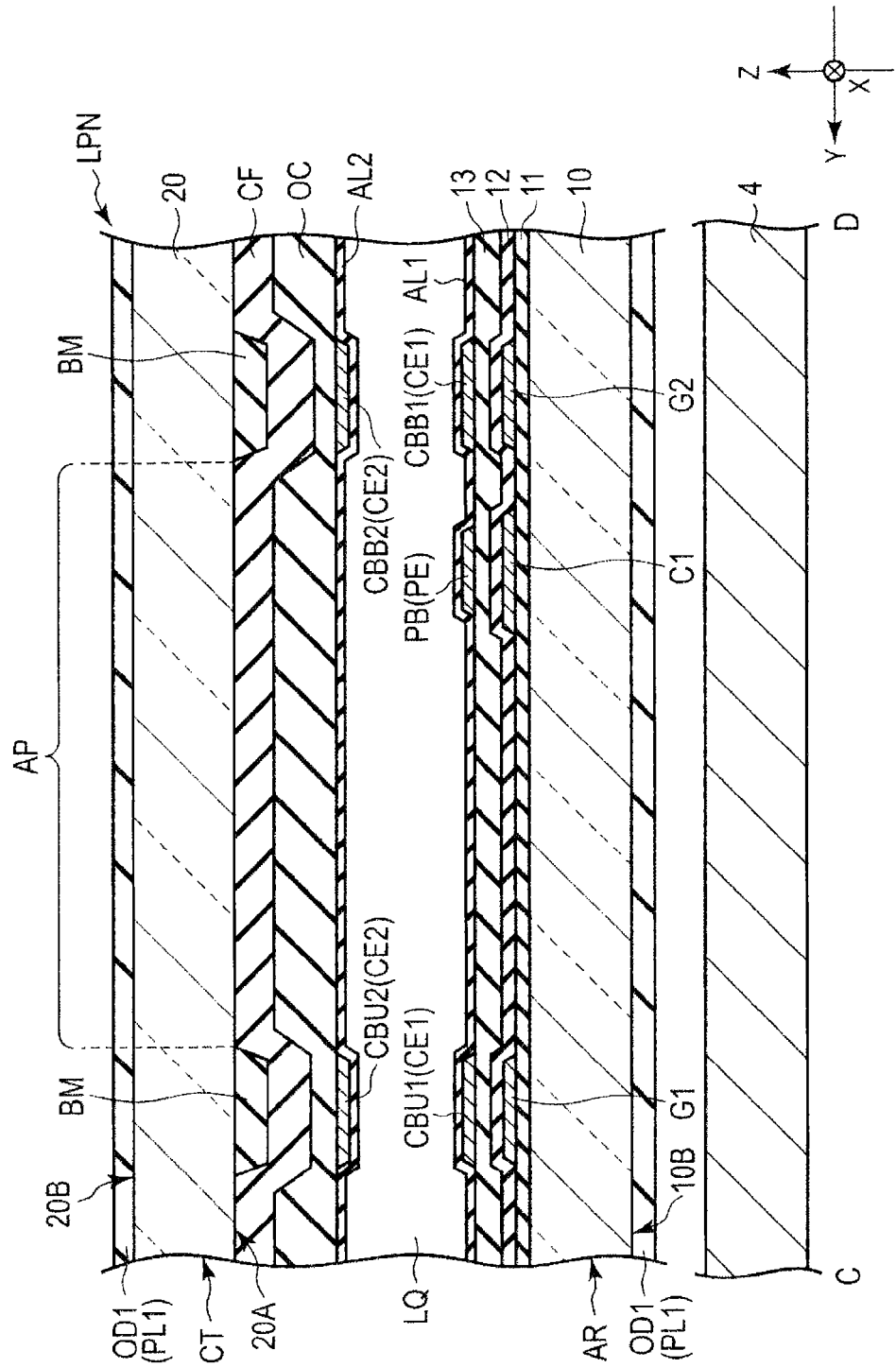
FIG. 5 is a cross-sectional view schematically showing a structure of the liquid crystal display panel taken along line C-D shown in FIG. 3A, seen from a source line S1 side.

FIG. 4 is a cross-sectional view schematically showing a structure taken along line A-B in the liquid crystal display panel LPN shown in FIG. 3A, seen from the gate line G1 side. FIG. 5 is a cross-sectional view schematically showing a structure taken along line C-D in the liquid crystal display panel LPN shown in FIG. 3A, seen from the source line S1 side. In addition, only the required portions for explanation are illustrated here.

A backlight 4 is arranged on the back side of the array substrate AR in the illustrated example. Various types of backlights 4 can be used. For example, a light emitting diode (LED) or a cold cathode fluorescent lamp (CCFL), etc., can be applied as a light source of the backlight 4, and the explanation about its detailed structure is omitted.

The array substrate AR is formed using a first transmissive insulating substrate 10. The array substrate AR includes the gate line G1, the gate line G2, the auxiliary capacitance line C1, the source line S1, the source line S2, the pixel electrode PE, the first common electrode CE1, a first insulating film 11, a second insulating film 12, a third insulating film 13, and the first alignment film AL1, etc., in the inner side of the first insulating substrate 10, i.e., on a side facing the counter substrate CT.

The gate line G1, the gate line G2, and the auxiliary capacitance line C1 are formed on the first insulating film 11, and are covered with the second insulating film 12. The source line S1 and the source line S2 are formed on the second insulating film 12, and are covered with the third insulating film 13. That is, the second insulating film 12 corresponds to an interlayer insulating film between the gate lines G1, G2 and the source lines S1, S2.

The main pixel electrode PA and the sub-pixel electrode PB constituting the pixel electrode PE, and the first main common electrode CAL1, the first main common electrode CAR1, the first sub-common electrode CBU1 and the first sub-common electrode CBB1 constituting the first common electrode CE1 are formed on the surface of the same insulating film, i.e., the surface of the third insulating film 13. Thus, the pixel electrode PE and the first common electrode CE1 can be formed by the same material.

The main pixel electrode PA is located in the inner side of the pixel rather than the position on the adjoining source line S1 and the source line S2. The sub-pixel electrode PB is located on the auxiliary capacitance line C1. The first main common electrode CAL1 is located on the source line S1. The first main common electrode CAR1 is located on the source line S2. The first sub-common electrode CBU1 is located on the gate line G1. The first sub-common electrode CBB1 is located on the gate line G2.

The first alignment film AL1 is arranged on the array substrate AR facing the counter substrate CT, and extends to whole active area ACT. The first alignment film AL1 covers the pixel electrode PE, the first common electrode CE1, etc., and is arranged also on the third interlayer insulating film 13. The first alignment film AL1 is formed of the material which shows a horizontal alignment characteristics.

The counter substrate CT is formed using a second insulating substrate 20 which has a transmissive characteristics. The counter substrate CT includes a black matrix BM, a color filter CF, an overcoat layer OC, the second common electrode CE2, and the second alignment film AL2, etc., in the internal surface of the second insulating substrate 20 facing the array substrate.

The black matrix BM is formed on the second insulating substrate 20 defining each pixel PX, and forms an aperture portion AP. That is, the black matrix BM is arranged so that line portions, i.e., the source line, the gate line, the auxiliary capacitance line, the switching element SW, may counter the black matrix BM. Herein, the black matrix BM includes a portion located above the source lines S1 and S2 extending along the second direction Y, and a portion located above the source lines G1 and G2 extending along the first direction X, and is formed in the shape of a lattice. The black matrix BM is formed in an internal surface 20A of the second insulating substrate 20 facing the array substrate AR.

The color filter CF is arranged corresponding to each pixel PX. That is, while the color filter CF is arranged in the aperture portion AP in the internal surface 20A of the second insulating substrate 20, a portion thereof runs on the black matrix BM. The colors of the color filters CF arranged in adjoining pixels PX in the first direction X differ mutually. For example, the color filters CF are formed of resin materials colored by three primary colors of red, blue, and green, respectively. The red color filter CFR formed of resin material colored in red is arranged corresponding to the red pixel. The blue color filter CFB formed of resin material colored in blue is arranged corresponding to the blue pixel. The green color filter CFG formed of resin material colored in green is arranged corresponding to the green pixel. The boundary between the adjoining color filters CF is located in a position which overlaps with the black matrix BM.

The overcoat layer OC covers the color filter CF. The overcoat layer OC eases influence of concave-convex of the surface of the color filter CF.

The second main common electrode CAL2, the second main common electrode CAR2, the second sub-common electrode CBU2, and the second sub-common electrode CBB2 constituting the second common electrode CE2 are formed on the overcoat layer OC facing the array substrate AR, and are located under the black matrix BM. The second main common electrode CAL2 is located above the first main common electrode CAL1. Moreover, the source line S1 is located under second main common electrode CAL2. The second main common electrode CAR2 is located above the first main common electrode CAR1. Moreover, the source line S2 is located under the second main common electrode CAR2. The second sub-common electrode CBU2 is located above the first sub-common electrode CBU1. Furthermore, the gate line G1 is located under the second sub-common electrode CBB2. The second sub-common electrode CBB2 is located above the first sub-common electrode CBB1. The gate line G2 is located under the second sub-common electrode CBB2.

In the above-mentioned aperture region AP, the region between the pixel electrode PE and the first and second common electrodes CE1 and CE2, that is, between the main pixel electrode PA and the first and second main common electrodes CAL1 and CAL2, and between the main pixel electrode PA and the first and second main common electrodes CAR1 and CAR2 corresponds to a transmissive region in which the backlight can penetrate.

The second alignment film AL2 is arranged on the counter substrate CT facing the array substrate AR, and extends to whole active area ACT. The second alignment film AL2 covers the second common electrode CE2 and the overcoat layer OC, etc. The second alignment film AL2 is formed of the materials having horizontal alignment characteristics.

The array substrate AR and the counter substrate CT as mentioned-above are arranged so that the first alignment film AL1 and the second alignment film AL2 face each other. In this case, a pillar-shaped spacer is formed integrally with one of the substrates by resin material between the first alignment film AL1 on the array substrate AR and the second alignment film AL2 on the counter substrate CT. Thereby, a predetermined gap, for example, a 2-7 μm cell gap, is formed, for example. The array substrate AR and the counter substrate CT are pasted together by seal material which is not illustrated, in which the predetermined cell gap is formed, for example.

The liquid crystal layer LQ is held at the cell gap formed between the array substrate AR and the counter substrate CT, and is arranged between the first alignment film AL1 and the second alignment film AL2. The liquid crystal layer LQ contains the liquid crystal molecule which is not illustrated. The liquid crystal layer LQ is constituted, for example, by positive type liquid crystal material.

A first optical element OD1 is attached on an external surface 10B of the array substrate AR, i.e., the external surface of the first insulating substrate 10 which constitutes the array substrate AR, by adhesives, etc. The first optical element OD1 is located in a side which counters with the backlight unit 4 of the liquid crystal display panel LPN, and controls the polarization state of the incident light which enters into the liquid crystal display panel LPN from the backlight unit 4. The first optical element OD1 includes a first polarizing plate PL1 having a first polarization axis (or first absorption axis) AX1. Other optical elements such as retardation film may be arranged between the first polarizing plate PL1 and the first insulating substrate 10.

A second optical element OD2 is attached on an external surface 20B of the counter substrate CT, i.e., the external surface of the second insulating substrate 20 which constitutes the counter substrate CT, by adhesives, etc. The second optical element OD2 is located in a display surface side of the liquid crystal display panel LPN, and controls the polarization state of emitted light from the liquid crystal display panel LPN. The second optical element OD2 includes a second polarizing plate PL2 having a second polarization axis (or second absorption axis) AX2. Other optical elements such as retardation film may be arranged between the second polarizing plate PL2 and the second insulating substrate 20.

The first polarization axis AX1 of the first polarizing plate PL1 and the second polarization axis AX2 of the second polarizing plate PL2 are arranged in the Cross Nicol state in which they substantially intersects perpendicularly. At this time, one polarizing plate is arranged, for example so that its polarization axis is arranged substantially in parallel with or in orthogonal with the extending direction of the main pixel electrode PA or the main common electrode CA. That is, when the extending directions of the main pixel electrode PA and the main common electrode CA are the second direction Y, the absorption axes of one polarizing plate is substantially in parallel with the second direction Y (crossing orthogonally with the first direction X), or crosses orthogonally with the second direction Y (in parallel with the first direction X).

Or one polarizing plate is arranged, for example, so that the polarization axis is arranged in the initial alignment direction of the liquid crystal molecule, i.e., in orthogonal with or in parallel with the first alignment treatment direction PD1 or the second alignment treatment direction PD2. When the initial alignment direction is in parallel with the second direction Y, the polarization axis of one polarizing plate is in parallel with the second direction Y or the first direction X.

In one example shown in FIG. 3B, the first polarizing plate PL1 is arranged so that the first polarization axis AX1 orthogonally intersects the extending direction of the main pixel electrode PA, i.e., the initial alignment direction (the second direction Y) of the liquid crystal molecule LM. The first polarization axis AX1 is arranged in parallel with the first direction X. The second polarizing plate PL2 is arranged so that the second polarization axis AX2 is arranged in parallel with the extending direction of the main pixel electrode PA, i.e., the initial alignment direction of the liquid crystal molecule LM. The second polarization axis AX2 is arrange in parallel with the second direction Y.

In other example shown in FIG. 3C, the second polarizing plate PL2 is arranged so that the second polarization axis AX2 orthogonally intersects the extending direction of the main pixel electrode PA, i.e., the initial alignment direction of the liquid crystal molecule LM. The second polarization axis AX2 is arranged in parallel with the first direction X. The first polarizing plate PL1 is arranged so that the first polarization axis AX1 is arranged in parallel with the extending direction of the main pixel electrode PA, i.e., the initial alignment direction of the liquid crystal molecule LM. The first polarization axis AX1 is arrange in parallel with the second direction Y.

Next, an operation of the liquid crystal display panel LPN of the above-mentioned structure is explained.

At the time of non-electric field state, i.e., when a potential difference (i.e., electric field) is not formed between the pixel electrode PE and the common electrode CE (the first common electrode CE1 and the second common electrode CE2), the liquid crystal molecules LM of the liquid crystal layer LQ are aligned so that their long axis are aligned in a parallel direction with the first alignment treatment direction PD1 of the first alignment film AL1 and the second alignment treatment direction PD2 of the second alignment film AL2 as shown with a dashed line in the figure. In this state, the time of OFF corresponds to the initial alignment state, and the alignment direction of the liquid crystal molecule LM corresponds to the initial alignment direction.

In addition, precisely, the liquid crystal molecules LM are not exclusively aligned in parallel with the X-Y plane, but are pre-tilted in many cases. For this reason, the precise direction of the initial alignment is a direction in which an orthogonal projection of the alignment direction of the liquid crystal molecule LM at the time of OFF is carried out to the X-Y plane.

Here, both of the first alignment treatment direction PD1 of the first alignment film AL1 and the second alignment treatment direction PD2 of the second alignment film AL2 are directions in parallel to the second direction Y and the same direction. At the time of OFF, the long axis of the liquid crystal molecule LM is initially aligned substantially in parallel to the second direction Y. That is, the direction of the initial alignment of the liquid crystal molecule LM is in parallel to the second direction Y, i.e., makes an angle of 0° with respect to the second direction Y, in which the main pixel electrode PA and the main common electrode CA extend.

Figure 6:
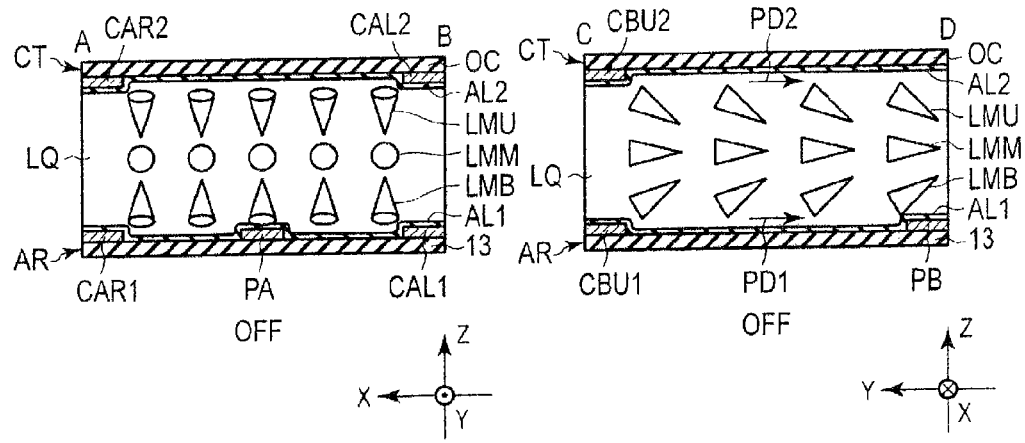
FIG. 6 is a figure schematically showing an alignment state of liquid crystal molecules in the liquid crystal layer at the time of OFF.

FIG. 6 is a figure schematically showing the alignment state of the liquid crystal molecule LM in the liquid crystal layer LQ at the time of OFF. In addition, although the liquid crystal molecule LM is generally in the shape of a rod or a rugby ball, herein, the liquid crystal molecule LM is illustrated by the shape of a cone. Each liquid crystal molecule LM has a conical bottom in one end portion, and a conical vertex in the other end portion. Moreover, the cross-sectional view taken along line A-B in the liquid crystal display panel LPN shown in FIG. 3A shows main elements among the structures shown in FIG. 4, that is, the main pixel electrode PA, the first main common electrode CAL1 and the first main common electrode CAR1 on the third insulating film 13 on the array substrate side, and the second main common electrode CAL2 and the second main common electrode CAR2 on the overcoat layer OC on the counter substrate side. Moreover, the cross-sectional view taken along line C-D in the liquid crystal display panel LPN shown in FIG. 3A shows main elements among the structures shown in FIG. 5, that is, the sub-pixel electrode PB and the first sub-common electrode CBU1 on the third insulating film 13 on the array substrate side, and the second sub-common electrode CBU2 on the overcoat layer OC on the counter substrate side.

In the cross-section of the liquid crystal layer LQ, the liquid crystal molecule LM, is aligned substantially in horizontal (a pre-tilt angle is substantially zero) near the intermediate portion of the liquid crystal layer LQ. The liquid crystal molecule LM is aligned with a pre-tilt angle which becomes symmetrical with respect to the intermediate portion in a portion near the array substrate AR (near the first alignment film AL1) and a portion near the counter substrate CT (near the second alignment film AL2) That is, the liquid crystal molecule LM is aligned in a splay alignment state.

In the cross-sectional view taken along line A-B, seen from the second sub-common electrode CBU2 side, i.e., on the starting side of the alignment treatment direction, the liquid crystal molecule LMM of the intermediate portion of the liquid crystal layer LQ is aligned so that the liquid crystal molecule LMM turns to the second direction Y that is the normal direction of the figure, and the conic bottom turns to the front side. The liquid crystal molecule LMB of the liquid crystal layer LQ near the array substrate AR is aligned so that the conic bottom turns to the array substrate AR side on the near side of the second direction Y, and the conic vertex turns to the counter substrate CT side on the far side of the second direction Y. The liquid crystal molecule LMU of the liquid crystal layer LQ near the counter substrate CT is aligned so that the conic bottom turns to the counter substrate CT side on the near side of the second direction Y, and the conic vertex turns to the array substrate AR side on the far side of the second direction Y.

In the cross-sectional view taken along line C-D, which looks the regions between the main pixel electrode PA and the first common electrode CAL1 and between the main pixel electrode PA and the second common electrode CAL2 from the second common electrode CAL2 side, the liquid crystal molecule LMM of the intermediate portion of the liquid crystal layer LQ is aligned so that the conic bottom turns to the starting side of the alignment treatment direction, and the conic vertex turns to the ending side of the alignment treatment direction substantially in parallel with the X-Y plane. The liquid crystal molecule LMB of the liquid crystal layer LQ near the array substrate AR is aligned so that the liquid crystal molecule LMB rises to the counter substrate CT side on the ending side of the first alignment treatment direction PD1, the conic bottom located on the starting side of the first alignment treatment direction PD1 turns to the array substrate AR side, and the conic vertex located on the ending side of the first alignment treatment direction PD1 turns to the counter substrate CT side. The liquid crystal molecule LMU of the liquid crystal layer LQ near the counter substrate CT is aligned so that the liquid crystal molecule LMU rises to the array substrate AR side on the ending side of the second alignment treatment direction PD2, the conic bottom located on the starting side of the second alignment treatment direction PD2 turns to the counter substrate CT side, and the conic vertex located on the ending side of the second alignment treatment direction PD2 turns to the array substrate AR side.

That is, in the cross-sectional view taken line C-D, the first alignment treatment direction PD1 is a direction aiming from the first sub-common electrode CBU1 to the sub-pixel electrode PB. The first sub-common electrode CBU1 is arranged on the starting side, and the sub-pixel electrode PB is arranged on the ending side. Moreover, the second alignment treatment direction PD2 is a direction in parallel to the first alignment treatment direction PD1, the second sub-common electrode CBU2 is arranged on the starting side, and the second sub-common electrode CBB2 is arranged on the ending side.

At the time of OFF, a portion of the backlight from the backlight 4 penetrates the first polarizing plate PL1, and enters into the liquid crystal display panel LPN. The light which entered into the liquid crystal display panel LPN is linearly polarized light which intersects perpendicularly with the first absorption axis AX1 of the first polarizing plate PL1. The polarization state of the linearly polarized light changes with the alignment state of the liquid crystal molecule LM when the linearly polarized light passes the liquid crystal layer LQ. However, at the time of OFF, the polarization state of the linearly polarized light which passes the liquid crystal layer LQ hardly changes. For this reason, the linearly polarized light which penetrates the liquid crystal display panel LPN is absorbed by the second polarizing plate PL2 which is arranged in Cross Nicol positional relationship with the first polarizing plate PL1 (black display).

The liquid crystal molecule LM near the first alignment film AL1 is initially aligned to the first alignment treatment direction PD1 by processing the first alignment film AL1 in the first alignment treatment direction PD1. Similarly, the liquid crystal molecule LM near the second alignment film AL2 is initially aligned to the second alignment treatment direction PD2 by processing the second alignment film AL2 in the second alignment treatment direction PD2. Further, in case the first alignment treatment direction PD1 is in parallel with and the same direction as the second alignment treatment direction PD2, the alignment state of the liquid crystal molecule LM of the liquid crystal layer LQ becomes the splay alignment as mentioned above. The liquid crystal molecule LMB near the first alignment film AL1 and the liquid crystal molecule LMU near the second alignment film AL2 become symmetrical with respect to the intermediate portion of the liquid crystal layer LQ on the upper and lower sides. For this reason, the visual angle inclining from the third direction Z, that is, the normal line direction of the substrate, is optically compensated by the liquid crystal molecule LMB and the liquid crystal molecule LMU. Therefore, when the first alignment treatment direction PD1 are in parallel with and the same as the second alignment treatment direction PD2, in a black display, there are few optical leaks. Thereby, a high contrast ratio can be realized, and it becomes possible to improve display grace.

On the other hand, in case potential difference (or electric field) is formed between the pixel electrode PE and the common electrode CE (the first common electrode CE1 and the second common electrode CE2), i.e., at the time of ON, the lateral electric field (or oblique electric field) is formed in parallel with the substrates between the pixel electrode PE and the common electrode CE. The liquid crystal molecule LM is affected by the electric field between the pixel electrode PE and the common electrode CE, and the alignment state changes.

In the example shown in FIG. 3A, in the region in the left-hand half of the pixel PX, i.e., the transmissive regions between the main pixel electrode PA and the second main common electrode CAL2, the alignment state of the liquid crystal molecule LM mainly changes by the electric field between the main pixel electrode PA and the second main common electrode CAL2, and between the main pixel electrode PA and the second sub-common electrode CBU2. In the X-Y plane, the liquid crystal molecule LM rotates counterclockwise to the second direction Y, and aligns so that it may turn to the upper left in the figure.

In the regions in the right-hand half of the pixel PX, i.e., the transmissive region between the main pixel electrode PA and the second main common electrode CAR2, the alignment state of the liquid crystal molecule LM mainly changes by the electric field between the main pixel electrode PA and the second main common electrode CAR2, and between the main pixel electrode PA and the second sub-common electrode CBU2. In the X-Y plane, the liquid crystal molecule LM rotates clockwise to the second direction Y, and aligns so that it may turn to the upper right in the figure.

Thus, in each pixel PX, in case electric field is formed between the pixel electrode PE and the common electrode CE, the alignment direction of the liquid crystal molecule LM is divided into two or more directions by the position which overlaps with the pixel electrode PE, and domains are formed in each alignment direction. That is, two or more domains are formed in one pixel PX.

At the time of ON, a portion of the backlight which entered into the liquid crystal display panel LPN from the backlight 4 penetrates the first polarizing plate PL1, and enters into the liquid crystal display panel LPN. The light which entered into the liquid crystal display panel LPN is linearly polarized light which intersects perpendicularly with the first absorption-axis AX1 of the first polarizing plate PL1. When the linearly polarized light passes the liquid crystal layer LQ, the polarization state of the linearly polarized light changes in accordance with the alignment state of the liquid crystal molecule LM. For example, if the linearly polarized light in parallel to the first direction X enters into the liquid crystal display panel LPN in the X-Y plane, when passing the liquid crystal layer LQ, the light receives the influence of phase difference by $\lambda/2$ by the liquid crystal molecule LM which is aligned in a 45°-225° direction or a 135°-315° direction with respect to the first direction X (herein, $\lambda$ is a wavelength of the light which penetrates the liquid crystal layer LQ). Thereby, the polarization state of the light which passes the liquid crystal layer LQ becomes linearly polarized light in parallel to the second direction Y. For this reason, at the time of ON, at least a portion of the light which passes the liquid crystal layer LQ penetrates the second polarizing plate PL2 (white display). However, in the position which overlaps with the pixel electrode or the common electrode, since the liquid crystal molecule maintains the initial alignment state, it becomes a black display like the time of OFF.

As mentioned above, in the structure according to this embodiment, the alignment direction of the liquid crystal molecule LM in one pixel is divided at least into two directions in the X-Y plane at the time of ON. The three-dimensional alignment state of the liquid crystal molecule LM in the liquid crystal layer LQ is mentioned later.

In order to realize the alignment state, it is necessary to provide the second main common electrode CAL2 and the second main common electrode CAR2 as the common electrode CE and the second sub-common electrode CBU2 in addition to the pixel electrode PE having the main pixel electrode PA. That is, the first main common electrode CA1 and the first sub-common electrode CB1 arranged on the array substrate AR, and the second sub-common electrode CBB2 arranged on the counter substrate CT are provided to shield electric field from other lines, to reinforce electric field required for the alignment control of the liquid crystal molecule LM, to form electric field required for the alignment control of the liquid crystal molecule LM in the adjoining pixels, or to make redundancy of the common electrode CE. Therefore, they are not indispensable to form the multi-domains.

Figure 7:
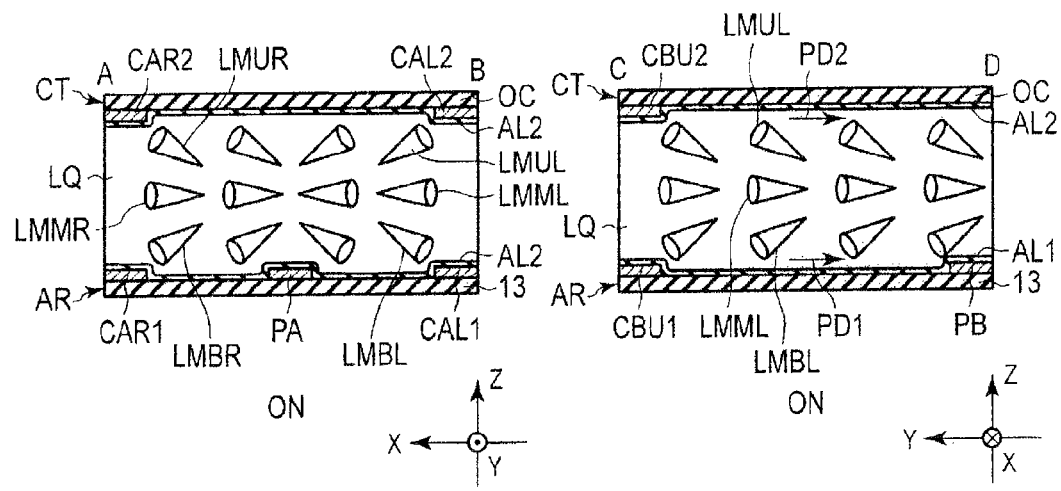

FIG. 7 is a figure schematically showing the alignment state of the liquid crystal molecule LM in the liquid crystal layer LQ at the time of ON. Also in the FIG. 7, the liquid crystal molecule LM is illustrated by the shape of a cone like FIG. 6. Moreover, only the principal portions are illustrated about the cross-sectional view taken along lines A-B and C-D.

In the cross-sectional view of the liquid crystal layer LQ, the alignment state of the liquid crystal molecule LM still maintains the splay alignment state like the time of OFF.

In a cross-sectional view taken along line A-B, the liquid crystal molecule LM between the main pixel electrode PA and the first main common electrode CAR1 and between the main pixel electrode PA and the second main common electrode CAR2 aligns so that the axis aiming from the conic vertex to the conic bottom turns from the main pixel electrode PA to the first main common electrode CAR1 or from the main pixel electrode PA to the second main common electrode CAR2. The liquid crystal molecule LMMR of the intermediate portion of the liquid crystal layer LQ aligns so that the conic bottom turns to the first main common electrode CAR1 side and the second main common electrode CAR2 side on the near side of the second direction Y, and the conic vertex turns to the main pixel electrode PA on the far side of the second direction Y. The liquid crystal molecule LMBR of the liquid crystal layer LQ near the array substrate AR aligns so that the conic bottom turns to the first main common electrode CAR1 on the near side of the second direction Y, and a conic vertex turns to the main pixel electrode PA on the far side of the second direction Y. The liquid crystal molecule LMUR of the liquid crystal layer LQ near the counter substrate CT aligns so that the conic bottom turns to the second main common electrode CAR2 on the near side of the second direction Y, and a conic vertex turns to the main pixel electrode PA on the far side of the second direction Y. The alignment state of the liquid crystal molecules LMMR, the liquid crystal molecule LMBR, and the liquid crystal molecule LMUR become the splay alignment state.

In a cross-sectional view taken along line A-B, the liquid crystal molecule LM between the main pixel electrode PA and the first main common electrode CAL1 and between the main pixel electrode PA and the second main common electrode CAL2 aligns so that the axis aiming from the conic vertex to the conic bottom turns from the main pixel electrode PA to the first main common electrode CAL1 or from the main pixel electrode PA to the second main common electrode CAL2. The liquid crystal molecule LMML in the intermediate region aligns so that the conic bottom turns to the first main common electrode CAL1 side and the second main common electrode CAL2 side on the near side of the second direction Y, and the conic vertex turns to the main pixel electrode PA on the far side of the second direction Y. The liquid crystal molecule LMBL near the array substrate side AR aligns so that the conic bottom turns to the first main common electrode CAL1 side on the near side of the second direction Y, and the conic vertex turns to the main pixel electrode PA on the far side of the second direction Y. The liquid crystal molecule LMUL of the liquid crystal layer LQ near the counter substrate CT aligns so that the conic bottom turns to the second main common electrode CAL2 on the near side of the second direction Y, and a conic vertex turns to the main pixel electrode PA on the far side of the second direction Y. The alignment state of the liquid crystal molecules LMML, the liquid crystal molecule LMBL, and the liquid crystal molecule LMUL become the splay alignment state.

In the cross-sectional view taken along line C-D, which looks at the regions between the main pixel electrode PA and the first main common electrode CAL1, and between the main pixel electrode PA and the second main common electrode CAL2 from the second main common electrode CAL2 side, the liquid crystal molecule LMML of the intermediate portion of the liquid crystal layer LQ is aligned so that the conic bottom located in the starting side of the alignment treatment direction is located on the near side of the first direction X, which is the normal line direction of the figure, and the conic bottom vertex on the ending side of the alignment treatment direction is located on the far side of the first direction X in parallel with the X-Y plane. The liquid crystal molecule LMBL near the substrate AR is aligned so that the conic bottom located on the starting side of the first alignment treatment direction PD1 turns to the substrate AR side and is located on the near side of the first direction X. The conic vertex located on the ending side of the first alignment treatment direction PD1 turns to the counter substrate CT side and is located on the far side of the first direction X. The liquid crystal molecule LMUL near the counter substrate CT is aligned so that the conic bottom located on the starting side of the second alignment treatment direction PD2 turns to the counter substrate CT side and is located on the near side of the first direction X. The conic vertex located on the ending side of the second alignment treatment direction PD2 turns to the array substrate AR side and is located on the far side of the first direction X.

Here, each alignment state of the liquid crystal molecule LMUR, the liquid crystal molecule LMBR, the liquid crystal molecule LMUL, and the liquid crystal molecule LMBL is explained in more detail, referring to FIG. 8A, FIG. 8B, FIG. 9A, and FIG. 9B In the following explanation, in the coordinate system in which the first direction X, the second direction Y, and the third direction Z intersect perpendicularly, a gravity point of the liquid crystal molecule LM is set to an original point, and the liquid crystal molecule LM initially aligns in a Y-Z plane.

Figure 8A:
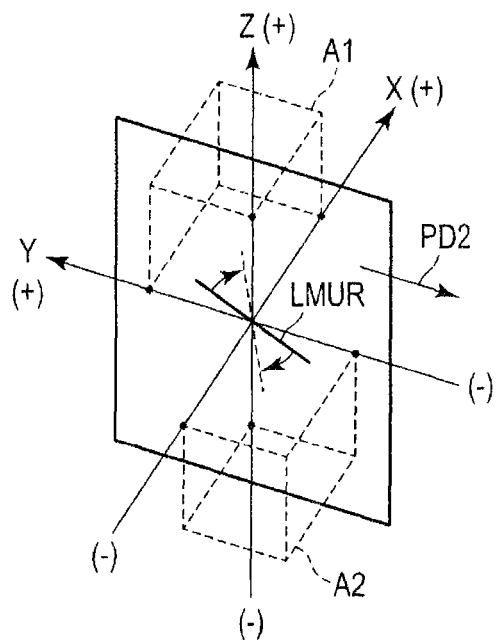
FIG. 8A is a figure showing an alignment state of a liquid crystal molecule LMUR.

FIG. 8A shows the alignment state of the liquid crystal molecule LMUR. The second alignment treatment direction PD2 of the second alignment film AL2 is a direction aiming from a positive side (+) to a negative (−) side in the second direction Y. As a solid line shows, the liquid crystal molecule LMUR at the time of OFF is initially aligned in the Y-Z plane. At the time of ON, as a dashed line shows, the liquid crystal molecule LMUR is aligned so that it may turn to a first domain A1 and a second domain A2. In the first domain A1, the first direction X is positive (+), the second direction Y is positive (+), and the third direction Z is positive (+). In the second domain A2, the first direction X is negative (−), the second direction Y is negative (−), and the third direction Z is negative (−).

Figure 8B:
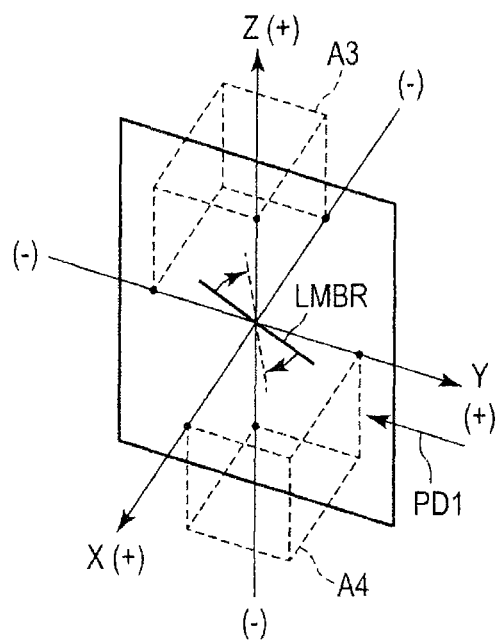
FIG. 8B is a figure showing the alignment state of a liquid crystal molecule LMBR.

FIG. 8B shows an alignment state of the liquid crystal molecule LMBR. The first alignment treatment direction PD1 of the first alignment film AL1 is a direction aiming from a positive side (+) to a negative (−) side in the second direction Y. As the solid line shows, the liquid crystal molecule LMBR at the time of OFF is initially aligned in the Y-Z plane. At the time of ON, as the dashed line shows, the liquid crystal molecule LMBR is aligned so that it may turn to a third domain A3 and a fourth domain A4. In the third domain A3, the first direction X is negative (−), the second direction Y is negative (−), and the third direction Z is positive (+). In the fourth domain, the first direction X is positive (+), the second direction Y is positive (+), and the third direction Z is negative (−).

Figure 9A:
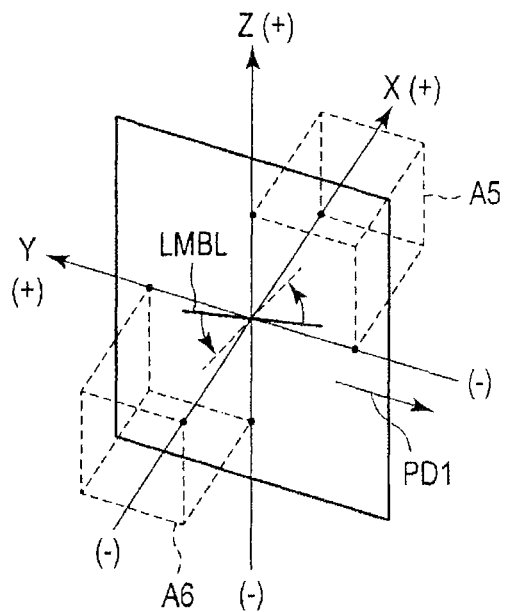
FIG. 9A is a figure showing the alignment state of a liquid crystal molecule LMBL.

FIG. 9A shows an alignment state of the liquid crystal molecule LMBL. The liquid crystal molecule LMBL at the time of OFF initially aligns in the Y-Z plane as shown in the solid line. As the dashed line shows, at the time of ON, the liquid crystal molecule LMBL is aligned so that it may turn to a fifth domain A5 and a sixth domain A6. In the fifth domain A5, the first direction X is positive (+), the second direction Y is negative (−), and the third direction Z is positive (+). In the sixth domain A6, the first direction X is negative (−), the second direction Y is positive (+), and the third direction Z is negative (−).

Figure 9B:
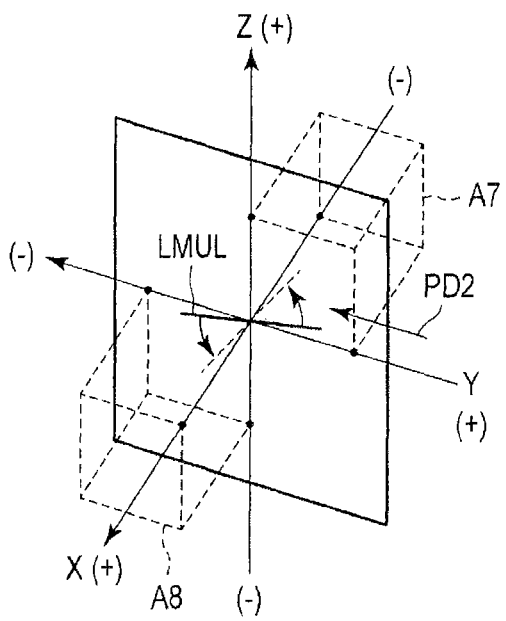
FIG. 9B is a figure showing the alignment state of a liquid crystal molecule LMUL.

FIG. 9B shows an alignment state of the liquid crystal molecule LMUL. The liquid crystal molecule LMUL at the time of OFF initially aligns in the Y-Z plane as shown in the solid line. As the dashed line shows, at the time of ON, the liquid crystal molecule LMUL is aligned so that it may turn to a seventh domain A7 and a eighth domain A8. In the seventh domain A7, the first direction X is negative (−), the second direction Y is positive (+), and the third direction Z is positive (+). In the eight domain A8, the first direction X is positive (+), the second direction Y is negative (−), and the third direction Z is negative (−).

Thus, the liquid crystal molecule LMUR, the liquid crystal molecule LMBR, the liquid crystal molecule LMUL, and the liquid crystal molecule LMBL align in different directions, respectively, in the three-dimensional space of the liquid crystal layer LQ, at the time of ON. Therefore, it becomes possible to form substantially four domains in one pixel by the respective liquid crystal molecules. Even at the time ON, the visual angle inclined from the third direction Z is compensated by the combination of the liquid crystal molecule LMUR and the liquid crystal molecule LMBR, and the combination of the liquid crystal molecule LMUL and the liquid crystal molecule LMBL. Therefore, the visual angle capable obtaining high transmissivity can be expanded without generating of gradation reversal, and wide viewing angle is attained.

Moreover, since high transmissivity is obtained in the electrode gap between the pixel electrode PE and the common electrode CE according to this embodiment, it becomes possible to correspond by expanding the inter-electrode distance between the pixel electrode PE and the main common electrode CA in order to make transmissivity of each pixel high enough. Moreover, in the product specifications in which a pixel pitch differs each other, a transmissive distribution peak can be used by changing the inter-electrode distance, i.e., by changing the arrangement location of the main common electrodes CA with respect to the main pixel electrode PA arranged in the center of the pixel. That is, in the display mode according to this embodiment, it becomes possible to offer the display panel having various pixel pitches by setting up inter-electrode distance without necessarily using microscopic processing corresponding to the product specification from low resolution with a comparatively large pixel pitch to high resolution with a comparatively small pixel pitch. Therefore, it becomes possible to realize the demand for high transmissivity and high resolution easily.

Moreover, if its attention is paid to the transmissivity distribution in the region which overlaps with the black matrix BM, the transmissivity fully falls. This is because the leak of electric field does not occur outside of the pixel from the common electrode CE, and undesired lateral electric field is not produced between the adjoining pixels on the both sides of the black matrix BM. That is, it is because the liquid crystal molecule of the region which overlaps with the black matrix BM maintains the state of initial alignment like at the OFF time (or the time of a black display). Therefore, even if it is a case where the colors of the color filters differ between the adjoining pixels, it becomes possible to control the generating of mixed colors, and also becomes possible to control the fall of color reproducibility and the contrast ratio.

Moreover, when an assembling shift occurs between the array substrate AR and the counter substrate CT, a difference may arises in distances between the respective common electrodes CE of the both sides of the pixel and the pixel electrode PE. However, the alignment shift is produced in common to all the pixels PX, there is no difference in the electric field distribution between the pixels PX, and the influence to the display of the image is negligible. Even if the assembling shift arises between the array substrate AR and the counter substrate CT, it becomes possible to control the undesirable electric field leak to the adjoining pixels. For this reason, even if it is in a case where the color of the color filter differs between the adjoining pixels, it becomes possible to control generating of mixed colors, and also becomes possible to suppress the falls of color reproducibility nature and the contrast ratio.

According to this embodiment, the main common electrode CA counters with the source line S. When the main common electrode CAL and the main common electrode CAR are especially arranged on the source line S1 and the source line S2, respectively, the aperture portion AP which contributes to the display can be expanded as compared with the case where the main common electrode CAL and the main common electrode CAR are arranged on the pixel electrode side rather than on the source line S1 and the source line S2, and it becomes possible to improve the transmissivity of the pixel PX.

Moreover, it becomes possible to expand the distances between the main pixel electrode PE and the main common electrode CAL, and between the main pixel electrode PE and the main common electrode CAR by arranging each of the main common electrode CAL and the main common electrode CAR on the source line S1 and the source line S2, respectively, and also becomes possible to form more horizontal electric field closer to the horizontal direction. For this reason, it becomes possible to also maintain the wide viewing angle which is advantages of the general IPS mode.

Moreover, according to this embodiment, the array substrate AR is equipped with the first main common electrode CA1 located on the both sides which sandwich the pixel electrode PE. Since the first main common electrode CA1 counters with the source line S, it becomes possible to shield undesirable electric field from the source line S. That is, the first main common electrode CA1 functions as a source shield electrode. For this reason, it becomes possible to control that undesirable bias is impressed from the source line S to the liquid crystal layer LQ. In a prior technique, a cross talk may be generated. That is, when a pixel is set to a potential which displays a black picture, and a potential corresponding to white display is supplied to the source line connected with the pixel, an optical leak may arise from a portion of the pixel, and may cause the rise of luminosity in the black display. According to this embodiment, the generation of such defect display is suppressed.

According to this embodiment, the array substrate AR includes the first sub-common electrode CB1 located on the both sides sandwiching the pixel electrode PE according to this embodiment. Since the first sub-common electrode CB1 counters with the gate line G, it becomes possible to shield undesirable electric field from the gate line G. That is, the first sub-common electrode CB1 functions as a gate shield electrode. For this reason, it can be controlled that undesirable bias is impressed from the gate line G to the liquid crystal layer LQ, and it also becomes possible to suppress the generating of defect display such as a printing picture and the optical leak resulting from the alignment defect of the liquid crystal molecule.

According to this embodiment, since the first main common electrode CA1 and the first sub-common electrode CB1 formed on the array substrate AR are connected each other and are formed in the shape of a lattice, it becomes possible to improve redundancy. Similarly, since the second main common electrode CA2 and the second sub-common electrode CB2 formed on the counter substrate CT are connected each other and are formed in the shape of a lattice, it becomes possible to improve redundancy. Accordingly, even if portions of the first common electrode CE1 or the second common electrode CE2 are cut or disconnected, it becomes possible to supply the common potential to respective pixels stably and suppress the generation of the defect display.

Furthermore, at the time of ON, since horizontal electric field is hardly formed (or sufficient electric field to drive the liquid crystal molecule LM is not formed), the liquid crystal molecule LM hardly moves from the initial alignment direction like at the time of OFF. For this reason, as mentioned-above, even if the pixel electrode PE and the common electrode CE are formed of the electric conductive material with the light transmissive characteristics in these domains, backlight hardly penetrates, and hardly contributes to the display at the time of ON. Therefore, the pixel electrode PE and the common electrode CE do not necessarily need to be formed of a transparent electric conductive material, and may be formed using such non-transparent electric conductive materials, aluminum (Al), titanium (Ti), silver (Ag), molybdenum (Mo), tungsten (W), and chromium (Cr).

When at least one of the pixel electrode PE and the common electrode CE is formed of the above-mentioned opaque electric conductive material, the linearly polarized light which entered into the liquid crystal display panel LPN is in parallel with or intersects perpendicularly the extending direction of the edge of the pixel electrode PE or the common electrode CE. Moreover, the extending direction of the gate line G, the auxiliary capacitance line C, and the source line S, respectively, formed of the above opaque electric conductive materials is substantially in parallel with or intersects perpendicularly the linearly polarized light. For this reason, in the reflected light by the edge of the pixel electrode PE, the common electrode CE, the gate line G, the auxiliary capacitance line C, and the source line S, the polarized face is not disturbed easily, and the polarized face can be maintained in the state where the linearly polarized light passed the first polarizing plate PL1. Therefore, since the linearly polarized light which penetrated the liquid crystal display panel LPN at the time of OFF is fully absorbed by the second polarizing plate PL2 which is a polarizer, it becomes possible to control optical leak. That is, transmissivity can be fully reduced in the case of a black display, and it becomes possible to control the fall of a contrast ratio. Moreover, it is not necessary to make the width of the black matrix BM large for the measure against the optical leak in the circumference of the pixel electrode PE or the common electrode CE. Accordingly, it becomes possible to control reduction of the area of the aperture portion AP and decrease of the transmissivity at the time of ON.

Figure 10:
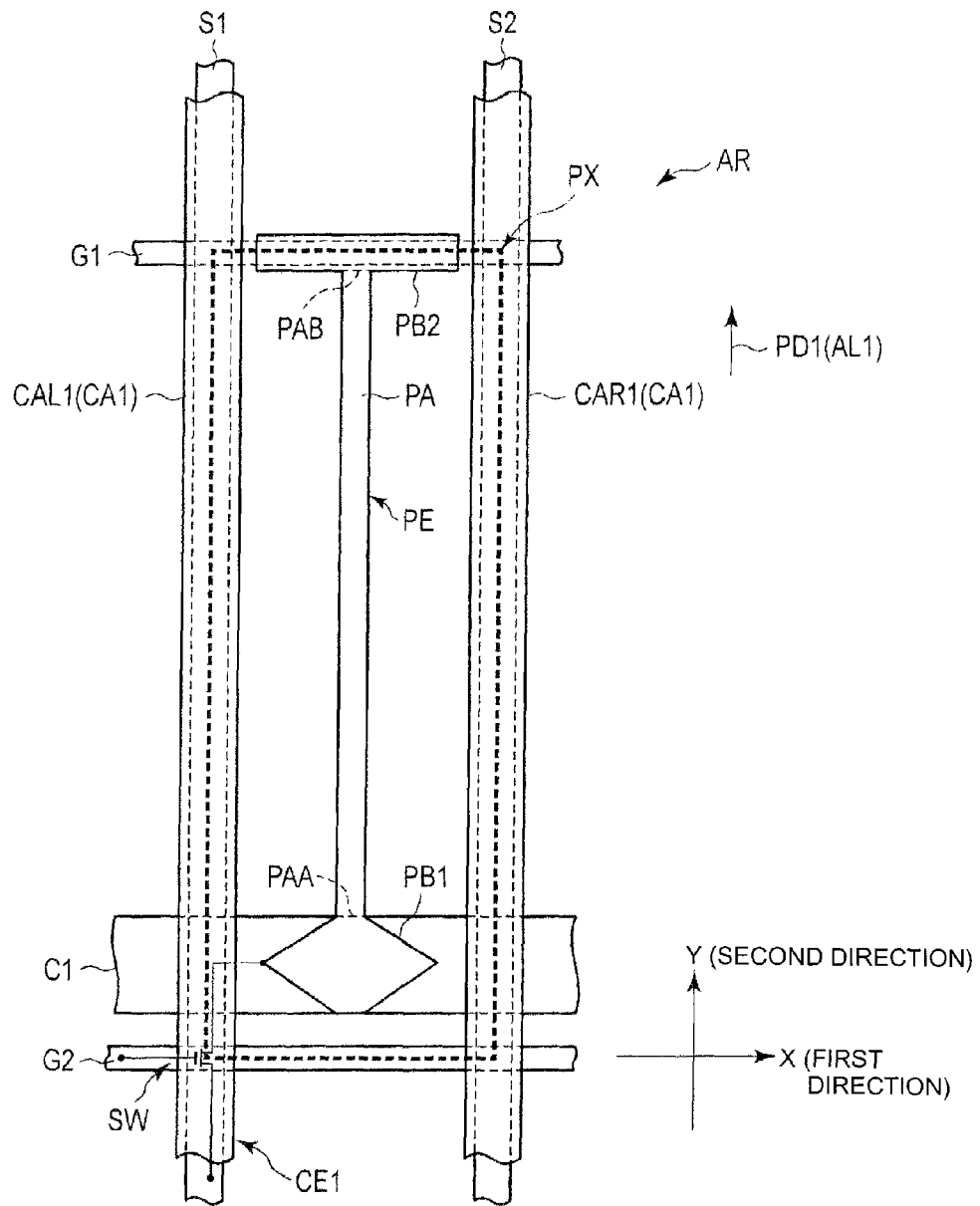
FIG. 10 is a plan view schematically showing the structure of one pixel in the array substrate shown in FIG. 1 when the array substrate is seen from the counter substrate side according to a second embodiment.

FIG. 10 is a plan view schematically showing the structure of the PX according to a second embodiment when the array substrate AR shown in FIG. 1 is seen from the counter substrate side.

The structure according to this embodiment is different from that shown in FIG. 2 in the following points. The first point is that while the first alignment treatment direction PD1 of the first alignment film AL1 is substantially in parallel with the second direction Y, the direction is opposite to that shown in FIG. 2. The second point is that the pixel electrode PE includes a first sub-pixel electrode PB1 and a second sub-pixel electrode PB2 in addition to the main pixel electrode PA. The third point is that the first sub-common electrode of the first common electrode CE1 is not formed. Hereinafter, explanations are made focusing on the above points.

The main pixel electrode PA of the pixel electrode PE, the first sub-pixel electrode PB1, and the second sub-pixel electrode PB2 are electrically connected mutually. The main pixel electrode PA includes one end portion PAA located on the starting side of the first alignment treatment direction PD1, and the other end portion PAB on the ending side of the first alignment treatment direction PD1. In the illustrated example, the first sub-pixel electrode PB1 is connected with the one end portion PAA of the main pixel electrode PA, and the second sub-pixel electrode PB2 is connected with the other end portion PAB of the main pixel electrode PA.

The first sub-pixel electrode PB1 is located in a region which overlaps with the auxiliary capacitance line C1, and is electrically connected with the switching element SW. The second sub-pixel electrode PB2 counters with the gate line G1. While the first sub-pixel electrode PB1 and the second sub-pixel electrode PB2 extend along the first direction X, they are apart from the first main common electrode CAL1 and the first main common electrode CAR1 located on the both sides which sandwich the pixel electrode PE.

The source line S1 is located under the first main common electrode CAL1, and the source line S2 is located under the first main common electrode CAR1. The first main common electrode CA1 functions as a source shield electrode like the above-mentioned embodiment. The auxiliary capacitance line C1 is located under the first sub-pixel electrode PB1, and the gate line G1 is located under the second sub-pixel electrode PB2. That is, the second sub-pixel electrode PB2 functions as a gate shield electrode.

Figures 11A, 11B, 11C:
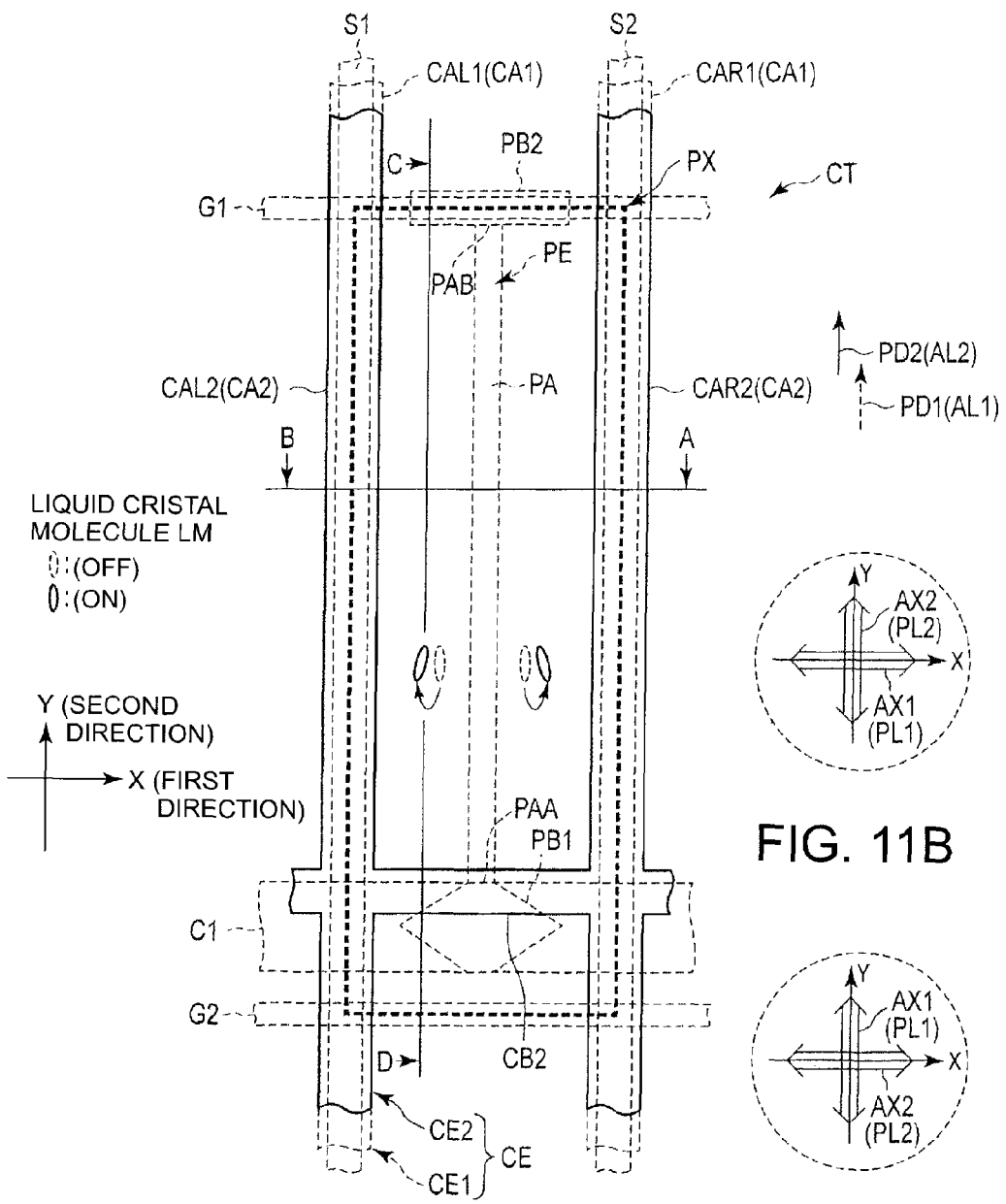
FIG. 11A is a plan view schematically showing the structure of the pixel in the counter substrate shown in FIG. 1 according to a third embodiment.
FIGS. 11B and 11C show the relationship between the polarization axis and the initial alignment direction.

FIG. 11A is a plan view schematically showing the structure of one pixel PX in the counter substrate CT shown in FIG. 1 according to a third embodiment. In addition, only structures required for explanation are illustrated. Here, the dashed line shows the principal portions of the array substrate AR, such as the pixel electrode PE, the first main common electrode CA1, the source line S, the gate line G, and the auxiliary capacitance line C.

The structure according to this embodiment is different from that shown in FIG. 3A in the following points. The first point is that while the second alignment treatment direction PD2 of the second alignment film AL2 is substantially in parallel with the second direction Y, like the first alignment treatment direction PD1, the direction is opposite to that shown in FIG. 3A, i.e., the same direction as that of the first alignment treatment direction PD1 shown in FIG. 10. The second point is that the second sub-common electrode CB2 of the second common electrode CE2 is arranged above the pixel electrode PE.

The second sub-common electrode CB2 extends along the first direction X on the other end portion PAA side of the main pixel electrode PA. The second sub-common electrode CB2 is located above the position where the main pixel electrode PA and the first sub-pixel electrode PB1 are connected, and a portion thereof is located above the auxiliary capacitance line C1. The second sub-common electrode CB2 is integrally and continuously formed with the second main common electrode CA2. That is, in the counter substrate CT, the second common electrode CE is formed in the shape of a lattice.

Next, the operation in the liquid crystal display panel LPN according to this embodiment is explained.

At the time of OFF, the liquid crystal molecule LM of the liquid crystal layer LQ aligns so that the long axis may turn to the first alignment treatment direction PD1 of the first alignment film AL1 and the second alignment treatment direction PD2 of the second alignment film AL2. That is, the liquid crystal molecule LM of the liquid crystal layer LQ initially aligns so that the long axis may turn to a substantially parallel direction to the second direction Y.

On the other hand, at the time of ON, lateral electric field substantially in parallel with the substrate (or oblique electric field) is formed between the pixel electrode PE and the common electrodes CE. The liquid crystal molecule LM is affected by the electric field between the pixel electrode PE and the common electrode CE, and the alignment state changes.

In the embodiment shown in FIG. 11A, in the region of the right-hand half of the pixel PX, i.e., the transmissive region between the main pixel electrode PA and the second main common electrode CAL2, the alignment state of the liquid crystal molecule LM changes by interactions of electric field between the main pixel electrode PA and the second main common electrode CAL2, and between the main pixel electrode PA and the second sub-common electrode CB2. In the X-Y plane, the liquid crystal molecule LM rotates clockwise to the second direction Y, and aligns so that it may turn to the lower left in the figure.

In the region on the right-hand half of the pixel PX, i.e., the transmissive region between the main pixel electrode PA and second main common electrode CAR2, the alignment state of the liquid crystal molecule LM changes by interactions of electric field between the main pixel electrode PA and the second main common electrode CAR2, and between the main pixel electrode PA and the second sub-common electrode CB2. In the X-Y plane, the liquid crystal molecule LM rotates counterclockwise to the second direction Y, and aligns so that it may turn to the lower right in the figure.

What is necessary is just to be equipped with at least the second main common electrode CAL2, the second main common electrode CAR2 and the second sub-common electrode CB2 as the common electrode CE, in addition to the pixel electrode PE including the main pixel electrode PA in order to realize such alignment.

Next, in the structure according to this embodiment, the alignment state of the liquid crystal molecule LM in the liquid crystal layer LQ is explained in detail.

Figure 12:
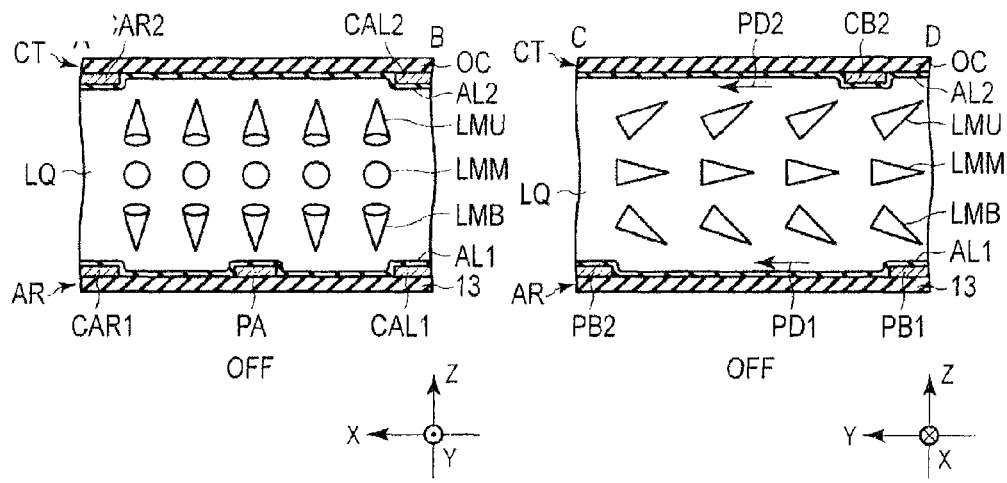
FIG. 12 is a figure schematically showing the alignment state of the liquid crystal molecules in the liquid crystal layer at the time of OFF.

FIG. 12 is a figure schematically showing the alignment state of the liquid crystal molecule LM in the liquid crystal layer LQ at the time of OFF. In addition, the liquid crystal molecule LM is illustrated by the shape of a cone like FIG. 6.

Moreover, only the principal portions are illustrated in the cross-sections taken along lines A-B and C-D.

In the cross-section of the liquid crystal layer LQ, the liquid crystal molecule LM is aligned substantially in horizontal (pre-tilt angle is substantially zero) near the intermediate portion of the liquid crystal layer LQ. The liquid crystal molecule LM is aligned with the pre-tilt angle so that the alignment becomes symmetrical with respect to the intermediate portion in a portion near the array substrate AR (near the first alignment film AL1) and a portion near the counter substrate CT (near the second alignment film AL2). The liquid crystal molecule LM is aligned in the splay alignment state.

In the cross-sectional view taken along line A-B, seen from the second sub-pixel electrode PB2 side i.e., the ending side of the alignment treatment direction, the liquid crystal molecule LMM of the intermediate portion of the liquid crystal layer LQ is aligned so that the liquid crystal molecule LMM turns to the second direction Y that is the normal direction of the figure, and the corn bottom turns to the front side. The liquid crystal molecule LMB of the liquid crystal layer LQ near the array substrate AR is aligned so that the conic bottom turns to the counter substrate CT side on the near side of the second direction Y, and the conic vertex turns to the array substrate AR side on the far side of the second direction Y. The liquid crystal molecule LMU of the liquid crystal layer LQ near the counter substrate CT is aligned so that the conic bottom turns to the array substrate AR side on the near side of the second direction Y, and the conic vertex turns to the counter substrate CT side on the far side of the second direction Y.

In the cross-sectional view taken along line C-D, which looks the regions between the main pixel electrode PA and the first common electrode CAL1 and between the main pixel electrode PA and the second common electrode CAL2 from the second common electrode CAL2 side, the liquid crystal molecule LMM of the intermediate portion of the liquid crystal layer LQ is aligned so that the conic bottom turns to the ending side of the alignment treatment direction, and the conic vertex turns to the starting side of the alignment treatment direction substantially in parallel with the X-Y plane. The liquid crystal molecule LMB of the liquid crystal layer LQ near the array substrate AR is aligned so that the liquid crystal molecule LMB rises to the counter substrate CT side on the ending side of the first alignment treatment direction PD1, the conic vertex located on the starting side of the first alignment treatment direction PD1 turns to the array substrate AR side, and the conic bottom located on the ending side of the first alignment treatment direction PD1 turns to the counter substrate CT side. The liquid crystal molecule LMU of the liquid crystal layer LQ near the counter substrate ART is aligned so that the liquid crystal molecule LMU rises to the array substrate AR side on the ending side of the second alignment treatment direction PD2, the conic vertex located on the starting side of the second alignment treatment direction PD2 turns to the counter substrate CT side, and the conic bottom located on the ending side of the second alignment treatment direction PD2 turns to the array substrate AR side.

Figure 13:
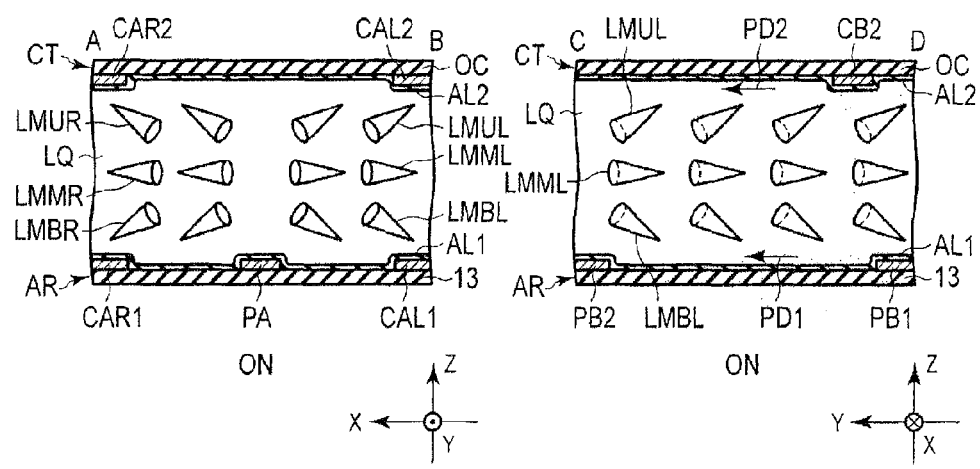

FIG. 13 is a figure schematically showing the alignment state of the liquid crystal molecule LM in the liquid crystal layer LQ at the time of ON. Also in the FIG. 13, the liquid crystal molecule LM is illustrated by the shape of a cone like FIG. 6. Moreover, only the principal portions are illustrated in the cross-sections taken along lines A-B and C-D.

In the cross-section of the liquid crystal layer LQ, the alignment state of the liquid crystal molecule LM still maintains the spray alignment state like the time of OFF.

In a cross-sectional view taken along line A-B, the liquid crystal molecule LM between the main pixel electrode PA and the first main common electrode CAR1 and between the main pixel electrode PA and the second main common electrode CAR2 aligns so that the axis aiming from the conic bottom to the conic vertex turns from the main pixel electrode PA to the first main common electrode CAR1 or from the main pixel electrode PA to the second main common electrode CAR2. The liquid crystal molecule LMMR in the intermediate portion aligns so that the conic vertex turns to the first main common electrode CAR1 and the second main common electrode side CAR2 on the far side of the second direction Y, and the conic bottom turns to the main pixel electrode PA on the near side of the second direction Y. The liquid crystal molecule LMBR near the array substrate side AR aligns so that the conic vertex turns to the first main common electrode CAR1 side on the far side of the second direction Y, and the conic bottom turns to the main pixel electrode PA on the near side of the second direction Y. The liquid crystal molecule LMUL of the liquid crystal layer LQ near the counter substrate CT aligns so that the conic vertex turns to the second main common electrode CAR2 on the far side of the second direction Y, and the conic bottom turns to the main pixel electrode PA on the near side of the second direction Y. The alignment state of the liquid crystal molecules LMMR, the liquid crystal molecule LMBR, and the liquid crystal molecule LMUR become the splay alignment state.

In a cross-sectional view taken along line A-B, the liquid crystal molecule LM between the main pixel electrode PA and the first main common electrode CAL1 and between the main pixel electrode PA and the second main common electrode CAL2 aligns so that the axis aiming from the conic bottom to the conic vertex turns from the main pixel electrode PA to the first main common electrode CAL1 or from the main pixel electrode PA to the second main common electrode CAL2. The liquid crystal molecule LMML in the intermediate portion aligns so that the conic vertex turns to the first main common electrode CAL1 and the second main common electrode CAL2 on the far side of the Y direction, and the conic bottom turns to the main pixel electrode PA on the near side of the second direction Y. The liquid crystal molecule LMBL near the array substrate side AR aligns so that the conic vertex turns toward the first main common electrode CAL1 on the far side of the second direction Y, and the conic bottom turns to the main pixel electrode PA on the near side of the second direction Y. The liquid crystal molecule LMUL of the liquid crystal layer LQ near the counter substrate CT aligns so that the conic vertex turns to the second main common electrode CAL2 on the far side of the second direction Y, and the conic bottom turns to the main pixel electrode PA on the near side of the second direction Y. The alignment state of the liquid crystal molecules LMML, the liquid crystal molecule LMBL, and the liquid crystal molecule LMUL become the splay alignment state.

In the cross-sectional view taken along line C-D, which looks the regions between the main pixel electrode PA and the first common electrode CAL1 and between the main pixel electrode PA and the second common electrode CAL2 from the second common electrode CAL2 side, the liquid crystal molecule LMML of the intermediate portion of the liquid crystal layer LQ is aligned so that the conic vertex located on the starting side of the alignment treatment direction is located on the near side of the first direction X that is a normal line of the figure, and the conic bottom located on the ending side of the alignment treatment direction is located on the far side of the first direction X substantially in parallel with the X-Y plane. The liquid crystal molecule LMB of the liquid crystal layer LQ near the array substrate AR is aligned so that the conic vertex located on the starting end of the first alignment treatment direction PD1 turns to the array substrate AR side, and is located on the near side of the first direction X. The conic bottom located on the ending side of the first alignment treatment direction PD1 turns to the counter substrate CT side, and is located on the far side of the first direction X. The liquid crystal molecule of the liquid crystal layer LQ near the counter substrate CT is aligned so that the conic vertex located on the starting end of the second alignment treatment direction PD2 turns to the counter substrate CT side, and is located on the near side of the first direction X. The conic bottom located on the ending side of the second alignment treatment direction PD2 turns to the array substrate AR side, and is located on the far side of the first direction X.

Also in the above embodiment, the same effect as other embodiments is acquired.

Although in the above embodiment, the auxiliary capacitance line is arranged under the sub-pixel electrode PB, gate line may be arranged under the sub-pixel electrode PB. Moreover, the arrangement position of the auxiliary capacitance line may not be lower side of the pixel (near the gate line G2). Furthermore, the arrangement position of the gate line may not be the upper end side or the lower end side of the pixel.

As explained above, according to the embodiments, it becomes possible to offer the liquid crystal display device which can control degradation of display grace.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal display device, comprising:
a first substrate including:
first and second gate lines extending in a first direction,
first and second source lines extending in a second direction orthogonally crossing the first direction,
a pixel electrode having a main pixel electrode in the shape of a belt, and
a first alignment film covering the pixel electrode, the first alignment film being alignment processed in a first alignment treatment direction substantially in parallel with an extending direction of the main pixel electrode;
a second substrate including:
a common electrode having a main common electrode arranged on both sides sandwiching the pixel electrode and extending substantially in parallel with the extending direction of the main pixel electrode, and a sub-common electrode extending in the first direction crossing the extending direction of the main pixel electrode on one end side of the main pixel electrode located closer to the second gate line, wherein the first alignment treatment direction is set from the second gate line toward the first gate line, and
a second alignment film alignment processed in a second alignment treatment direction substantially in the same direction as the first alignment treatment direction;
a liquid crystal layer held between the first substrate and the second substrate and having liquid crystal molecules,
wherein the pixel electrode includes a sub-pixel electrode connected with the other end of the main pixel electrode located closer to the first gate line and formed in the shape of a diamond.

2. The liquid crystal display device according to claim 1, wherein the source line is arranged under the main common electrode, the second gate line is arranged under the sub-common electrode, and an auxiliary capacitance line is arranged under the sub-pixel electrode.

3. The liquid crystal display device according to claim 2, wherein the first substrate includes a source line shield electrode facing the source line and set to the same potential as that of the common electrode, and a gate line shield electrode facing the gate line and set to the same potential as that of the common electrode.

4. A liquid crystal display device, comprising:
a first substrate including:
first and second gate lines extending in a first direction,
first and second source lines extending in a second direction orthogonally crossing the first direction,
a pixel electrode having a main pixel electrode in the shape of a belt, and
a first alignment film covering the pixel electrode, the first alignment film being alignment processed in a first alignment treatment direction substantially in parallel with an extending direction of the main pixel electrode;
a second substrate including:
a common electrode having a main common electrode arranged on both sides sandwiching the pixel electrode and extending substantially in parallel with the extending direction of the main pixel electrode, and a sub-common electrode extending in the first direction crossing the extending direction of the main pixel electrode on one end side of the main pixel electrode located closer to the first gate line, wherein the first alignment treatment direction is set from the first gate line toward the second gate line, and
a second alignment film alignment processed in a second alignment treatment direction substantially in the same direction as the first alignment treatment direction;
a liquid crystal layer held between the first substrate and the second substrate and having liquid crystal molecules;
wherein the pixel electrode includes a first sub-pixel electrode connected with the other end side of the main pixel electrode located closer to the second gate line and a second sub-pixel electrode connected with the one end side of the main pixel electrode located closer to the first gate line.

5. The liquid crystal display device according to claim 4, wherein the source line is arranged under the main common electrode, an auxiliary capacitance line is arranged under the second sub-pixel electrode, and the second gate line is arranged under the first sub-pixel electrode.

6. The liquid crystal display device according to claim 5, wherein the first substrate includes a source line shield electrode facing the source line and set to the same potential as that of the common electrode.

7. A liquid crystal display device, comprising:
a first substrate including:
first and second gate lines, respectively, extending in a first direction and first and second source lines, respectively, extending in a second direction orthogonally crossing the first direction, a pixel electrode having a main pixel electrode in the shape of a belt extending in the second direction and a sub-pixel electrode extending in the first direction, a first common electrode having a first main common electrode facing the first and second source lines and extending in the second direction on both sides sandwiching the main pixel electrode, and a first alignment film covering the pixel electrode and the first common electrode and being alignment processed in a first alignment treatment direction substantially in parallel with the second direction;

a second substrate including:

a second common electrode having a second main common electrode extending in the second direction on both sides sandwiching the main pixel electrode and a sub-common electrode extending in the first direction on one end side of the main pixel electrode located closer to the first gate line, wherein the first alignment treatment direction is set from the first gate line toward the second gate line, and a second alignment film covering the second common electrode and being alignment processed in a second alignment treatment direction which is the same direction as the first alignment treatment direction;

a liquid crystal layer held between the first substrate and the second substrate and having liquid crystal molecules, wherein the sub-common electrode is arranged above the pixel electrode apart from the first gate line in plane.

8. The liquid crystal display device according to claim 7, wherein the sub-common electrode is arranged above a connecting portion in which the main pixel electrode is connected with the sub-pixel electrode.

9. The liquid crystal display device according to claim 7, wherein an auxiliary capacitance line is arranged under the sub-pixel electrode.

10. The liquid crystal display device according to claim 7, wherein the distance between the main pixel electrode and the first main common electrode is larger twice than that of the thickness of the liquid crystal layer.

11. The liquid crystal display device according to claim 7, wherein the liquid crystal molecules are aligned in a splay alignment state.

* * * * *